United States Patent
Monoi et al.

(10) Patent No.: US 10,301,409 B2
(45) Date of Patent: May 28, 2019

(54) ETHYLENE-BASED POLYMER, MANUFACTURING METHOD OF ETHYLENE-BASED POLYMER AND MANUFACTURING METHOD OF CATALYST FOR POLYMERIZATION, AND MOLDED ARTICLE OF HOLLOW PLASTICS CONTAINING ETHYLENE-BASED POLYMER AND USE THEREOF

(75) Inventors: Takashi Monoi, Kanagawa (JP); Yuuichi Kuzuba, Kanagawa (JP); Satoshi Kanazawa, Kanagawa (JP); Kouichi Ogawa, Kanagawa (JP)

(73) Assignee: JAPAN POLYETHYLENE CORPORATION, Tokyo (JP)

(*) Notice: Subject to any disclaimer, the term of this patent is extended or adjusted under 35 U.S.C. 154(b) by 1134 days.

(21) Appl. No.: 14/008,719

(22) PCT Filed: Mar. 29, 2012

(86) PCT No.: PCT/JP2012/058487
§ 371 (c)(1),
(2), (4) Date: Sep. 30, 2013

(87) PCT Pub. No.: WO2012/133713
PCT Pub. Date: Oct. 4, 2012

(65) Prior Publication Data
US 2014/0030460 A1    Jan. 30, 2014

(30) Foreign Application Priority Data
Mar. 30, 2011    (JP) .................................. 2011-074900

(51) Int. Cl.
*C08F 210/16* (2006.01)
*C08F 4/69* (2006.01)
*C08F 210/14* (2006.01)

(52) U.S. Cl.
CPC .......... *C08F 210/14* (2013.01); *C08F 210/16* (2013.01); *Y10T 428/1397* (2015.01)

(58) Field of Classification Search
CPC .... C08F 4/24; B01J 23/26; B01J 37/12; B01J 37/14; B01J 6/001; B01J 35/1023; B01J 35/1047
USPC .......................................... 526/106; 502/256
See application file for complete search history.

(56) References Cited

U.S. PATENT DOCUMENTS

| | | | |
|---|---|---|---|
| 4,593,079 A * | 6/1986 | Rekers ..................... | C08F 10/00 526/100 |
| 5,232,883 A * | 8/1993 | Derleth ..................... | B01J 2/08 502/242 |
| 5,310,834 A * | 5/1994 | Katzen ..................... | C08F 10/00 502/113 |
| 6,194,528 B1 | 2/2001 | Debras | |
| 6,518,375 B1 | 2/2003 | Monoi et al. | |
| 7,205,358 B2 | 4/2007 | Mitsuno | |
| 7,271,122 B2 * | 9/2007 | Bodart ..................... | C08F 10/02 502/103 |
| 7,705,097 B2 | 4/2010 | Mihan et al. | |
| 7,714,091 B2 | 5/2010 | Mihan et al. | |
| 8,420,754 B2 | 4/2013 | Cann et al. | |
| 9,193,809 B2 * | 11/2015 | Kuzuba ..................... | C08F 10/00 |
| 2004/0014914 A1 | 1/2004 | Schneider et al. | |
| 2004/0029727 A1 | 2/2004 | Bodart et al. | |
| 2006/0172884 A1 | 8/2006 | Schneider et al. | |
| 2008/0009407 A1 | 1/2008 | Bodart et al. | |
| 2008/0177013 A1 | 7/2008 | Schneider et al. | |
| 2008/0299342 A1 | 12/2008 | Schneider et al. | |
| 2010/0069585 A1 | 3/2010 | Bodart et al. | |
| 2010/0256314 A1 * | 10/2010 | Marsden ................. | C08F 10/02 526/131 |
| 2010/0291334 A1 * | 11/2010 | Cann ....................... | C08F 10/00 428/36.9 |
| 2011/0172322 A1 | 7/2011 | Michel et al. | |
| 2012/0058288 A1 | 3/2012 | Kuzuba et al. | |
| 2013/0216835 A1 * | 8/2013 | Moineau ................. | C08F 10/02 428/402 |
| 2013/0280462 A1 * | 10/2013 | Kuzuba ................. | C08F 210/16 428/36.92 |
| 2013/0310526 A1 * | 11/2013 | Jorgensen ................ | B01J 37/04 526/106 |

FOREIGN PATENT DOCUMENTS

| | | | | |
|---|---|---|---|---|
| CN | 1214344 A | * | 4/1999 | ............ C08F 110/02 |
| EP | 2 657 260 A1 | | 10/2013 | |
| JP | 6-199920 A | | 7/1994 | |

(Continued)

OTHER PUBLICATIONS

English translation of JP 2009161615 A.*
Extended European Search Report dated Apr. 8, 2015 in Patent Application No. 12765418.4.
Combined Office Action and Search Report dated Apr. 1, 2015 in Chinese Patent Application No. 201280016940.9 (with English language translation and English translation of categories of cited documents).
Office Action dated May 12, 2015 in Japanese Patent Application No. 2012-075333 (with English machine translation).
Notification of Reasons for Refusal dated Jul. 21, 2015 in Japanese Patent Application No. 2012-075333 (with machine English language translation).

(Continued)

*Primary Examiner* — Rip A Lee
(74) *Attorney, Agent, or Firm* — Oblon, McClelland, Maier & Neustadt, L.L.P.

(57) ABSTRACT

An object of the invention is to provide an ethylene-based polymer excellent in moldability and durability, and also excellent in the balance of stiffness and durability, and to provide a molded product of hollow plastic using the ethylene-based polymer. The ethylene-based polymer according to the invention is an ethylene-based polymer having specific characteristics and manufactured by a homopolymerization of ethylene or a copolymerization of ethylene and α-olefin using a chromium catalyst.

19 Claims, 2 Drawing Sheets

(56) References Cited

FOREIGN PATENT DOCUMENTS

| | | | |
|---|---|---|---|
| JP | 11-092522 A | 4/1999 | |
| JP | 2000-344820 A | 12/2000 | |
| JP | 2001-510504 A | 7/2001 | |
| JP | 2002-080521 A | 3/2002 | |
| JP | 2003-096127 A | 4/2003 | |
| JP | 2003-183287 A | 7/2003 | |
| JP | 2003-313225 A | 11/2003 | |
| JP | 2003-535930 A | 12/2003 | |
| JP | 2004-002832 A | 1/2004 | |
| JP | 2004-502795 A | 1/2004 | |
| JP | 2006-512454 A | 4/2006 | |
| JP | 2006-182917 A | 7/2006 | |
| JP | 2008-502757 A | 1/2008 | |
| JP | 2008-502759 A | 1/2008 | |
| JP | 2008-502760 A | 1/2008 | |
| JP | 2009-161615 A | 7/2009 | |
| JP | 2009161615 A | * 7/2009 | |
| JP | 2009-173889 | 8/2009 | |
| JP | 2009-533511 A | 9/2009 | |
| JP | 2011-006589 A | 1/2011 | |
| WO | WO 94/13708 A1 | 6/1994 | |
| WO | WO 01/40326 A1 | 6/2001 | |
| WO | WO 2004/096434 A1 | 11/2004 | |
| WO | WO 2010/150410 A1 | 12/2010 | |

OTHER PUBLICATIONS

International Search Report dated Jul. 3, 2012 in PCT/JP2012/058487.

M.P. McDaniel, "Supported Chromium Catalysts for Ethylene Polymerization" Advances in Catalysis, vol. 33, 1985, 52 Pages.

M.P. McDaniel, "Polymerization Reactions, Phillips Process for Ethylene Polymerization" Handbook of Heterogeneous Catalysis, 1997, 6 Pages.

M. Bruce Welch, et al. "Olefin Polymerization Catalyst Technology" Handbook of Polyolefins: Synthesis and Properties, 1993, 18 Pages.

C.E. Marsden, et al., "The Influence of Silica Support on Polymerisation Catalyst Performance" Preparation of Catalysts, vol. V, 1991, 13 Pages.

C.E. Marsden, "Advances in supported chromium catalysts" Plastics, Rubber and Composites Processing and Application, vol. 21, 1994, 8 Pages.

V.J. Ruddick, et al. "Mechanistic Study of the Calcination of Supported Chromium (III) Precursors for Ethene Polymerization Catalysts" J. Phys. Chem, vol. 100,1996, pp. 11062-11066.

Steve M. Augustine, et al. "A Proposed Mechanism for Silica Supported Chromium HDPE Catalyst Activation" Journal of Catalysis, vol. 161, 1996, pp. 641-650.

T.J. Pullukat, et al. "A Chemical Study of Thermally Activated Chromic Titanate on Silica Ethylene Polymerization Catalysts" Journal of Polymer Science: Polymer Chemistry Edition, vol. 18, 1980, 10 Pages.

M.P. McDaniel, et al. "The Activation of the Phillips Polymerization Catalyst" Journal of Catalysis, vol. 82, 1983, pp. 118-126.

H. Schonfelder, et al. "A Novel Reactor to Activate Chromium-Catalysts" Reaction Kinetics and the Development of Catalytic Processes, vol. 122, 1999, 9 Pages.

U.S. Appl. No. 13/318,486, filed Nov. 2, 2011, US2012/0058288 A1, Kuzuba, et al.

U.S. Appl. No. 13/997,568, filed Jun. 24, 2013, US2013/0280462 A1, Kuzuba, et al.

Supplementary Search Report dated Nov. 27, 2014 in European Patent Application No. 12765418.4.

Office Action dated Jan. 21, 2016 in European Patent Application No. 12 765 418.4.

Office Action dated Nov. 23, 2015 in Chinese Patent Application No. 201280016940.9 (with English language translation).

Max P. McDaniel, "Advances in Catalysis", *Elsevier*, (2010) vol. 53, pp. 392-395.

Notice of Opposition dated Sep. 5, 2017, in corresponding European Patent application No. 12765418.4.

Office Action dated Dec. 4, 2018 in Indian Patent Application No. 8453/DELNP/2013 (with unedited computer generated English translation).

* cited by examiner

[Fig. 1]
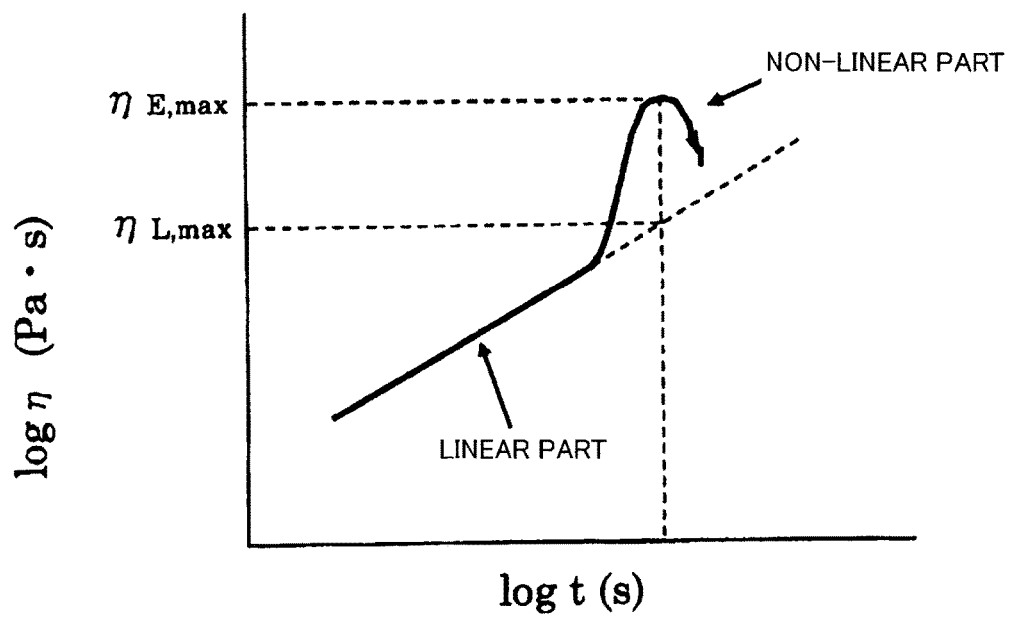

[Fig. 2]
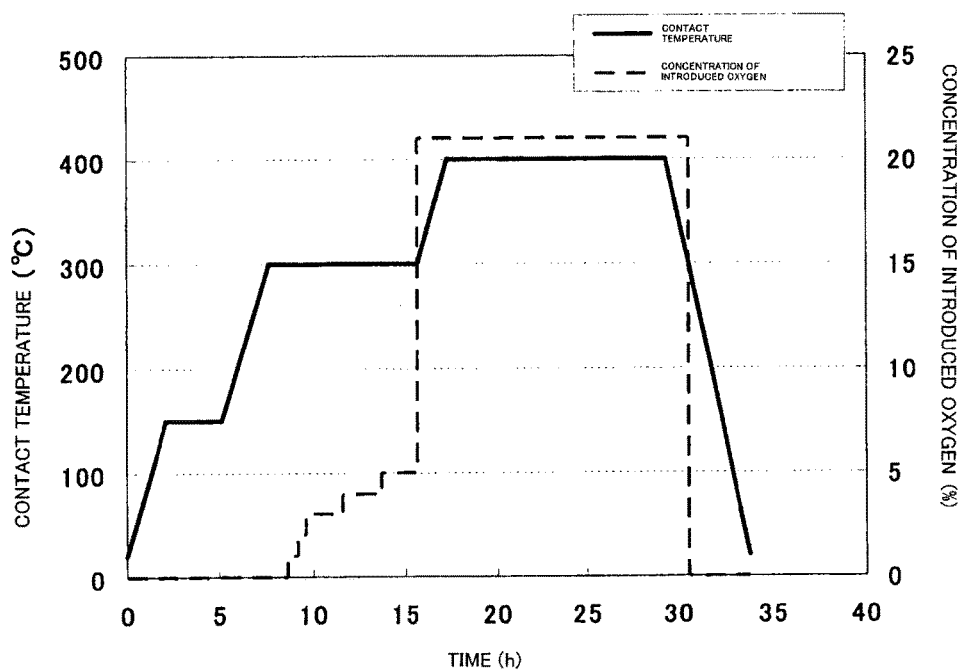

ETHYLENE-BASED POLYMER, MANUFACTURING METHOD OF ETHYLENE-BASED POLYMER AND MANUFACTURING METHOD OF CATALYST FOR POLYMERIZATION, AND MOLDED ARTICLE OF HOLLOW PLASTICS CONTAINING ETHYLENE-BASED POLYMER AND USE THEREOF

TECHNICAL FIELD

The present invention relates to an ethylene-based polymer, a method for manufacturing an ethylene-based polymer, and a method for manufacturing a catalyst for polymerization. More specifically, the invention relates to an ethylene-based polymer obtained by a specific manufacturing method, satisfying predetermined conditions, excellent in an impact resisting property, moldability, and the balance of stiffness and durability, and also relates to a molded product of hollow plastic containing the above resin excellent in an impact resisting property, moldability, stiffness, durability and a barrier property.

The invention further relates to the uses materialized of a plastic molded product excellent in an impact resisting property, moldability, stiffness, durability, and a barrier property, as hollow plastic products, such as a tank, a can, a bottle, in particular, a fuel tank of an automobile.

BACKGROUND ART

In recent years, pipes, films, injection molded products and hollow molded products made of plastics have been actively used in various kinds of industrial fields. Above all, hollow molded products of plastics are used as containers such as fuel cans and plastic bottles. Also, in automobile parts, molded product of hollow plastics made of polyethylene are used as fuel tanks and they are replacing conventional fuel tanks made of metal materials. As compared with the case of metal materials, containers and fuel tanks made of plastics are advantageous in the point of lightening, since a weight/volume ratio is small. Also, they are characterized in that corrosion such as rust is difficult to occur and impact resistance is good, and so uses have been widened more and more.

In a plastic fuel tank obtained from polyethylene, especially high levels are required concerning mechanical strength, durability and impact resistance to obtain important safety parts for securing the safety of automobiles, and to improve these properties until sufficiently high levels, further development of materials is progressed.

In general, a polyethylene, i.e., an ethylene-based polymer, is manufactured by homopolymerization of ethylene or copolymerization of comonomers such as ethylene, α-olefin and the like by using a polymerization catalyst. For manufacturing ethylene-based polymers having pertinent characteristics suited to their uses, various catalysts have been developed. As a major polymerization catalyst at present, a Phillips catalyst holds an important position ranking with a radical polymerization catalyst, a Ziegler catalyst and a metallocene catalyst.

A Phillips catalyst is a chromium catalyst obtained by making an inorganic oxide support to support a chromium compound such as silica, silica-alumina, silica-titania or the like, and activating in a non-reducing atmosphere, to thereby make at least a part of chromium atoms of the carried chromium atoms hexavalent. Since a Phillips catalyst is capable of molding an ethylene-based polymer having an excellent melt processing characteristic attributable to relatively broad range of molecular weight distribution and a long chain branched structure, it is an important catalyst for polymerization in the manufacture of an ethylene-based polymer for use in particular in a hollow molded product.

Concerning the Phillips catalysts for manufacturing polyethylene for blow molding excellent in mechanical strength, durability and impact resistance, various examinations have been done as follows.

For example, in patent document 1, a method of manufacturing polyethylene suitable for a blow-molded product, in particular a large sized blow-molded product, by performing polymerization in the coexistence of hydrogen by using a chromium catalyst supporting a trialkylaluminum compound is proposed. In patent document 1, a method of manufacturing polyethylene by using a chromium catalyst supporting a dialkylaluminum alkoxide compound is also disclosed (refer to Comparative Example 13). Further, it is disclosed in patent document 1 to select a support capable of having the specific surface area of the chromium catalyst of 350 $m^2/g$ or more after calcining for activation, and to perform calcining for activation in the temperature range of 400 to 900° C. However, the patent does not necessarily disclose polyethylene suitable for a fuel tank of an automobile and a chromium catalyst having high activity which is suitable for the manufacture thereof, and it cannot be said that a fuel tank of an automobile having sufficient durability can be manufactured.

In patent document 2 is disclosed a method of manufacturing polyethylene by adding an organic aluminum compound to a polymerization reactor as a co-catalyst and using a chromium catalyst, that is, a method of manufacturing polyethylene by using a chromium catalyst supporting a trialkylaluminum and/or a dialkylaluminum alkoxide compound (refer to Examples 2 to 6). There is also disclosed in patent document 2 a chromium catalyst, which is activated at about 400° C. to about 860° C., comprising a chromium oxide, a silica-containing support containing a silica selected from the group consisting of silica (a) having a pore space volume of about 1.1 $cm^3/g$ to about 1.8 $cm^3/g$ and a surface area of about 245 $m^2/g$ to about 375 $m^2/g$, silica (b) having a pore space volume of about 2.4 $cm^3/g$ to about 3.7 $cm^3/g$ and a surface area of about 410 $m^2/g$ to about 620 $m^2/g$, and silica (c) having a pore space volume of about 0.9 $cm^3/g$ to about 1.4 $cm^3/g$ and a surface area of about 390 $m^2/g$ to about 590 $m^2/g$, and an organic aluminum compound. However, polyethylene suitable for a molded product of hollow plastic, in particular, the fuel tank of an automobile, excellent both in durability (ESCR and the like) and impact resistance, and a highly activated chromium catalyst preferably used in the manufacture of the polyethylene are not necessarily disclosed in the same patent document.

Also, patent document 3 proposes a method of manufacturing polyethylene by using a chromium catalyst supporting a trialkylaluminum and/or a dialkylaluminum alkoxide compound. Further, in patent document 3, a catalyst obtained by activating a silica-titanium cogel catalyst containing chromium at 550° C. is disclosed (refer to Example 17). However, specific properties of the support are not described in patent document 3, and, further, polyethylene suitable for a molded product of hollow plastic, in particular, the fuel tank of an automobile, and a highly activated chromium catalyst preferably used in the manufacture of the polyethylene are not necessarily disclosed in the same patent document.

Patent document 4 proposes a manufacturing method of an ethylene-based polymer using a chromium catalyst obtained by using an inorganic oxide support supporting a chromium compound calcined for activation in a non-reducing atmosphere to thereby make at least a part of the chromium atoms hexavalent, which carries a specific organic aluminum compound (e.g., alkoxide, siloxide, phenoxide, and the like) in an inactive hydrocarbon solvent, and an ethylene-based polymer excellent in the balance of environmental stress crack resistance (ESCR) and stiffness is disclosed therein. Patent document 4 also discloses a chromium catalyst obtained by using an inorganic oxide support having a specific surface area of 100 $m^2/g$ to 1,000 $m^2/g$ and calcining for activation at 400° C. to 900° C. However, according to the method described in patent document 4, lowering of the molecular weight is limited, although the molecular weight can be controlled by hydrogen, and so a highly active catalyst is not necessarily disclosed.

Patent document 5 proposes a catalyst for manufacturing an ethylene-based polymer comprising a chromium catalyst obtained by making an inorganic oxide support to support a chromium compound and calcining for activation in a non-reducing atmosphere to thereby make at least a part of the chromium atoms hexavalent, and a specific organic aluminum compound (e.g., alkoxide, siloxide, and the like), and an ethylene-based polymer excellent in ESCR or a creep resisting property is disclosed. In addition, a chromium catalyst obtained by using an inorganic oxide support having a specific surface area of 100 $m^2/g$ to 1,000 $m^2/g$ and calcining for activation at 400° C. to 900° C. is disclosed in patent document 5. However, according to the method described in patent document 5, it is possible to broaden the molecular weight distribution by multistage polymerization, but there is limitation in broadening the molecular weight, and so it cannot be said that a further preferred catalyst is disclosed.

Further, in performing homopolymerization of ethylene or copolymerization of ethylene and α-olefin having 3 to 8 carbon atoms continuously in multistage with a plurality of polymerization reactors connected in series by using a chromium catalyst obtained by making an inorganic oxide support to support a chromium compound and calcining for activation in a non-reducing atmosphere to thereby make at least a part of the chromium atoms hexavalent, patent document 6 proposes a manufacturing method of an ethylene-based polymer comprising introducing a specific organic aluminum compound (e.g., alkoxide, siloxide, and the like) into any one or all of the polymerization reactors, and an ethylene-based polymer excellent in environmental stress crack resistance (ESCR) and a creep resisting property is disclosed. Further, a chromium catalyst which is obtained by using an inorganic oxide support having a specific surface area of 100 $m^2/g$ to 1,000 $m^2/g$ and by calcining for activation at 400° C. to 900° C. is disclosed in patent document 6. However, although an ethylene-based polymer having molecular weight distribution (Mw/Mn) of 20.9 (refer to Reference Example) is disclosed in patent document 6, polyethylene suitable for a molded product of hollow plastic, in particular, the fuel tank of an automobile, excellent in impact resistance, and a highly activated chromium catalyst preferably used in the manufacture of the polyethylene are not disclosed in the same patent document.

Patent document 7 proposes a catalyst for ethylene polymerization comprising a fluorinated chromium compound in which at least a part of the chromium atoms becomes hexavalent by activation in a non-reducing atmosphere carrying a specific organic boron compound. Patent document 7 also discloses a manufacturing method of polyethylene by using a chromium catalyst supporting a trialkylaluminum and/or a dialkylaluminum alkoxide compound (refer to Comparative Examples 6 and 8). Patent document 7 further discloses a chromium catalyst obtained by using an inorganic oxide support having a specific surface area of 100 $m^2/g$ to 1,000 $m^2/g$ and calcining for activation at 400° C. to 900° C. However, polyethylene suitable for a molded product of hollow plastic, in particular, the fuel tank of an automobile, and a highly activated chromium catalyst preferably used in the manufacture of the polyethylene are not disclosed in patent document 7.

On the other hand, techniques capable of obtaining further excellent ethylene polymers by using at least two kinds of chromium-supported catalyst systems are disclosed.

For example, in patent document 8, at least two kinds of chromium-supported catalyst systems having a sufficient difference in the average pore radii for preferentially introducing a comonomer into a relatively high molecular weight area of the polyethylene to be obtained are disclosed, and with these catalyst systems, an ethylene polymer having high density and high environmental stress crack resistance (ESCR) is obtained. Further, patent document 8 discloses a chromium catalyst system whose base material has a specific average pore radius, the activation in high concentration of which is performed at a temperature of about 750° C. to about 900° C., and activation at a low temperature is performed at a temperature of about 450° C. to about 700° C. However, polyethylene suitable for a molded product of hollow plastic, in particular, the fuel tank of an automobile, and a highly activated chromium catalyst preferably used in the manufacture of the polyethylene are not disclosed in patent document 8.

Further, patent document 9 also discloses a catalyst system comprising the blend of two kinds of chromium-supported catalyst systems of silica alumina as the first catalytic component and silica titania as the second catalytic component. By the use of this catalyst system, an ethylene polymer having high environmental stress crack resistance (ESCR) is obtained. A catalyst using a support having a specific surface area of at least 350 $m^2/g$ and activated at 250° C. to 950° C. is also disclosed in patent document 9. However, polyethylene suitable for a molded product of hollow plastic, in particular, the fuel tank of an automobile, and a highly activated chromium catalyst preferably used in the manufacture of the polyethylene are not disclosed in patent document 9.

Also, patent document 10 discloses a polyethylene-based resin satisfying specific requirements, such as the strain hardening parameter of elongation viscosity and the like, and excellent in moldability, durability, a barrier property, and the balance of impact resistance and stiffness, which is above all preferably used for a fuel tank, and the manufacturing method of the resin. Patent document 10 also discloses, as a chromium catalyst, a catalyst using a support having a specific surface area of 250 $m^2/g$ or more and generally 1,000 $m^2/g$ or less, and activated by calcining at a temperature of 400° C. to 900° C. However, since the manufacture of the catalyst includes the process of supporting an organic aluminum compound after supporting a chromium compound and activation by calcining, the number of manufacturing processes of the catalyst increases.

Patent document 11 discloses that polyethylene having high destruction resistance, high parison stability, and high environmental stress crack resistance can be obtained by performing ethylene polymerization with a catalyst obtained by making an inorganic support to support a zinc compound and a chromium compound and then calcining.

Patent document 12 discloses that polyethylene excellent in ESCR and impact tension strength can be obtained by performing ethylene polymerization with a catalyst obtained by making an inorganic support to support a zirconium compound and a chromium compound and then calcining.

Patent document 13 discloses to perform ethylene polymerization by using a chromium catalyst obtained by preparing a homogeneous solution comprising a chromium compound and a metal compound selected from among Mg, Ca, Sr, B, Al, Si, P, Bi, Sc, V, Mn, Fe, Co, Ni, Cu, Zn, Zr, Nb, Mo, Ru, Rh, Pd, Hf, Ta and W, and bringing the solution into contact with an inorganic support to obtain a solid catalyst precursor, and then calcining the catalyst precursor. Patent document 13 also discloses that discharge reduction of fine polymer dusts is achieved by the above method, and polymer products having improved characteristics, for example, a polymer film having an improved film quality, and a film causing spotting with low frequency can be obtained.

Patent documents 11 to 13 disclose catalysts obtained by calcining an inorganic support containing a chromium compound and other metal compounds, but the calcining methods are not disclosed in detail.

Calcining for activation of an inorganic oxide containing a chromium compound is usually carried out in a non-reducing atmosphere or in an inert gas atmosphere by increasing the temperature in the oven from room temperature. When the temperature in the oven is increased in the presence of oxygen, since heat generation occurs due to combustion by the carbon and hydrogen in the chromium compound contained in the inorganic support, the temperature in the oven steeply increases and it becomes difficult to control the temperature in the oven. The temperature increase in the oven due to combustion of the hydrocarbon becomes further conspicuous when the inorganic support contains a metal-containing hydrocarbon compound other than the chromium compound. However, there are no disclosures suggesting the improving methods concerning the calcining methods in patent documents 11 to 13.

Patent document 14 discloses a calcining method of the support supporting a titanium compound and a chromium compound comprising (a) after heating a catalyst precursor in an inert atmosphere at 370° C. to 540° C., (b) introducing oxygen at a temperature in the oven of not exceeding 510° C., (c) completing the calcining of the catalyst, and (d) obtaining the catalyst. However, patent document 14 does not disclose the manufacturing method of the catalyst by bringing the catalyst precursor into contact with oxygen at a low activation temperature of 300° C. to 500° C., and examples are not also disclosed. Patent document 14 discloses so as not to cause temperature spike at the time of the introduction of oxygen in calcining of the catalyst precursor, but the same patent document does not describe concerning what an effect it has thereon.

In addition to the above, as commercially available polyethylene for use in the fuel tank of automobiles, for example, high density polyethylene "HB111R" manufactured by Japan Polyethylene Corporation and high density polyethylene "4261AG" manufactured by Basell are known.

These products are materials which acquired good evaluations in the market by responding well to severe demands of the automobile manufacturers, but further higher levels are required concerning impact resistance, moldability, and the balance of stiffness and durability. In these circumstances, polymers excellent in physical properties and manufacturing methods of polyethylene still more excellent in polymerization activity are required, and further improvement of chromium catalysts suitable for the manufacture has been advanced.

BACKGROUND ART DOCUMENT

Patent Document

Patent Document 1: JP-A-2002-080521 (the term "JP-A" as used herein refers to an "unexamined published Japanese patent application")
Patent Document 2: JP-T-2006-512454 (the term "JP-T" as used herein refers to a "published Japanese translation of a PCT patent application")
Patent Document 3: International Publication WO 94/13708
Patent Document 4: JP-A-2003-096127
Patent Document 5: JP-A-2003-183287
Patent Document 6: JP-A-2003-313225
Patent Document 7: JP-A-2006-182917
Patent Document 8: JP-A-6-199920
Patent Document 9: International Publication WO 2001/40326
Patent Document 10: International Publication WO 2010/150410
Patent Document 11: JP-T-2008-502757
Patent Document 12: JP-T-2008-502760
Patent Document 13: JP-T-2008-502759
Patent Document 14: International Publication WO 2004/096434

SUMMARY OF THE INVENTION

Problems that the Invention is to Solve

In view of the above problems, an object of the invention is to provide a method for manufacturing an ethylene-based polymer excellent in moldability, impact resistance, and the balance of stiffness and durability, in particular, a method capable of manufacturing an ethylene-based polymer suitable for a molded product of hollow plastic efficiently and with high polymerization activity, and another object is to provide an ethylene-based polymer obtained by the method or a blow-molded product.

Means for Solving the Problems

As a result of eager examinations to solve the above problems, the present inventors have found that an ethylene-based polymer excellent in moldability, durability, and the balance of impact resistance and stiffness can be obtained in high activity by using a chromium catalyst as the catalyst for ethylene polymerization, which is obtained by having a chromium compound supporting on an inorganic oxide support having a specific particulate property, calcining the support in a condition such that at least a part of chromium atoms becomes hexavalent, and calcining for activating (activation) the support at a specific temperature, in particular, at a relatively low temperature. On the basis of the above knowledge, the invention has been attained.

That is, according to the first invention of the present invention, an ethylene-based polymer which is manufactured by a homopolymerization of ethylene or a copolymerization of ethylene and α-olefin by using a chromium catalyst, and has the following characteristics of (1) to (8), is provided:

(1) the high load melt flow rate (HLMFR) is 1 to 10 g/10 min,
(2) the density is 0.940 to 0.960 g/cm$^3$,
(3) the molecular weight distribution (Mw/Mn) is 25 or more,
(4) the strain hardening parameter of elongation viscosity (λmax) is 1.05 to 1.50,
(5) the Charpy impact strength is 7 kJ/m$^2$ or more,
(6) the tensile impact strength is 130 kJ/m$^2$ or more,
(7) the swell ratio (SR) is 50 to 65%, and
(8) the rupture time in the full notch creep test is 40 hours or more.

According to the second invention of the present invention, the ethylene-based polymer as described in the first invention, wherein the chromium catalyst is a catalyst obtained by having a chromium compound (b) supported on an inorganic oxide support (a) having a specific surface area of 625 to 1,000 m$^2$/g and a pore volume of 1.0 to 5.0 cm$^3$/g, and drying and calcining the obtained inorganic oxide support (a) in a non-reducing atmosphere, provided.

According to the third invention of the present invention, the ethylene-based polymer as described in the first invention or the second invention, which is a copolymer of ethylene and α-olefin having 3 to 8 carbon atoms, is provided.

According to the fourth invention of the present invention, a method for manufacturing an ethylene-based polymer comprising homopolymerizing ethylene or copolymerizing ethylene and α-olefin using a catalyst, in which the catalyst is obtained by activating a catalyst precursor (d) at 250° C. to 550° C. in a non-reducing atmosphere, and the catalyst precursor (d) comprises: an inorganic oxide support (a) having a specific surface area of 625 to 1,000 m$^2$/g and a pore volume of 1.0 to 5.0 cm$^3$/g; and a chromium compound (b) supported on the support (a), wherein the catalyst is used in the form of not supporting an organic aluminum compound thereon after activation, is provided.

According to the fifth invention of the present invention, the method for manufacturing an ethylene-based polymer as described in the fourth invention, wherein the activation temperature is 300 to 500° C., is provided.

According to the sixth invention of the present invention, the method for manufacturing an ethylene-based polymer as described in the fourth invention or the fifth invention, wherein the inorganic oxide support (a) contains 0.5 to 5.0% by weight of aluminum, is provided.

According to the seventh invention of the present invention, the method for manufacturing an ethylene-based polymer as any one of the fourth to the sixth inventions, wherein the α-olefin has 3 to 8 carbon atoms, is provided.

According to the eighth invention of the present invention, a method for manufacturing a chromium catalyst for ethylene polymerization, comprising calcining, in a non-reducing atmosphere, a catalyst precursor (d) having a chromium compound (b) and a hydrocarbon compound (c) containing a metal other than chromium, supported on an inorganic oxide support (a), wherein a calcining process of the catalyst precursor (d) comprises a first process of maintaining a contact temperature in the range of 100° C. to 360° C. for five minutes to 48 hours, while introducing an inert gas, and a second process, after the first process, of performing calcining for 5 minutes to 72 hours by regulating the concentration of oxygen to be introduced, so as to maintain a contact temperature in the range of 200° C. to 500° C., is provided.

According to the ninth invention of the present invention, the method for manufacturing a chromium catalyst for ethylene polymerization as described in the eighth invention, wherein at the time of initiating oxygen introduction in the second process, the concentration of oxygen is 2% or less, and the contact temperature is 300° C. to 370° C., is provided.

According to the tenth invention of the present invention, the method for manufacturing a chromium catalyst for ethylene polymerization as described in the eighth invention or the ninth invention, wherein the rate of the hexavalent chromium to the gross chromium content supported on the inorganic oxide support (a) after calcining is 70% by weight to 100% by weight, is provided.

According to the eleventh invention of the present invention, the method for manufacturing a chromium catalyst for ethylene polymerization as described in the any one of the eighth to the tenth inventions, wherein the metal contained in the metal-containing hydrocarbon compound (c) is aluminum, is provided.

According to the twelfth invention of the present invention, the method for manufacturing a chromium catalyst for ethylene polymerization as described in the any one of the eighth to eleventh inventions, wherein the metal-containing hydrocarbon compound (c) is contained so that the metal content in the catalyst becomes 0.5% by weight to 5.0% by weight and the sum total of the carbon and hydrogen in the catalyst becomes 0.5% by weight to 20.0% by weight, is provided.

According to the thirteenth invention of the present invention, the method for manufacturing a chromium catalyst for ethylene polymerization as described in the eighth to twelfth inventions, which comprises a third process of introducing an inert gas mixture of oxygen and inert gas having a prescribed oxygen concentration for 5 minutes to 72 hours at a contact temperature in the range of 250° C. to 550° C. after the second process, is provided.

According to the fourteenth invention of the present invention, a molded product of hollow plastic, which comprises a layer containing the ethylene-based polymer as described in any one of the first to third inventions, is provided.

According to the fifteenth invention of the present invention, the molded product of hollow plastic as described in the fourteenth invention, which is at least one kind selected from the group consisting of a fuel tank, a lamp oil can, a drum can, a chemical container, an agricultural chemical container, a solvent container, and a plastic bottle.

Advantage of the Invention

By using the method for manufacturing an ethylene-based polymer according to the invention, an ethylene-based polymer excellent in moldability, durability (FNCT and the like), and the balance of impact resistance and stiffness can be obtained in high activity, and, in particular, an ethylene-based polymer suitable for a molded product of hollow plastic can be manufactured efficiently and in high activity. The molded product of hollow plastic is excellent in moldability, impact resistance, and the balance of stiffness and durability. As the uses of the molded product of hollow plastic, a fuel tank, a lamp oil can, a drum can, a chemical container, an agricultural chemical container, a solvent container, and a plastic bottle are exemplified, and preferably a fuel tank and especially preferably the fuel tank of an automobile.

BRIEF DESCRIPTION OF THE DRAWINGS

FIG. 1 is a drawing for explaining the measuring method of the strain hardening parameter of elongation viscosity (λmax).

FIG. 2 is a drawing for explaining the variation with time of the contact temperature and the introduced oxygen concentration.

MODE FOR CARRYING OUT THE INVENTION

The manufacturing method of an ethylene-based polymer according to the invention is characterized in that a chromium catalyst obtained by having a chromium compound supporting on an inorganic oxide support having a specific particulate property, calcining the support in a condition such that at least a part of chromium atoms becomes hexavalent, and calcining for activating (activation) the support at a specific temperature, in particular, at a relatively low temperature, is used as the catalyst for ethylene polymerization.

Further, the ethylene-based polymer manufactured by the method of the invention is excellent in moldability, durability, and the balance of impact resistance and stiffness, and is an ethylene-based polymer suitable in particular for a molded product of hollow plastic.

The invention is specifically described below with every item.

[I] Ethylene-Based Polymer

The ethylene-based polymer in the invention (hereinafter also referred to as "polyethylene") is manufactured by homopolymerization of an ethylene or copolymerization of an ethylene and an α-olefin by using a chromium-containing catalyst, and satisfies the following requirements (1) to (8).

(1) the high load melt flow rate (HLMFR) is 1 to 10 g/10 min,
(2) the density is 0.940 to 0.960 g/cm$^3$,
(3) the molecular weight distribution (Mw/Mn) is 25 or more,
(4) the strain hardening parameter of elongation viscosity (λmax) is 1.05 to 1.50,
(5) the Charpy impact strength is 7 kJ/m$^2$ or more,
(6) the tensile impact strength is 130 kJ/m$^2$ or more,
(7) the swell ratio (SR) is 50 to 65%, and
(8) the rupture time in the full notch creep test is 40 hours or more.

Each of these requirements is described in detail below.

(1) High Load Melt Flow Rate (HLMFR)

The ethylene-based polymer according to the invention has HLMFR in the range of 1 to 10 g/10 min, preferably in the range of 3 to 7 g/10 min, and more preferably in the range of 4 to 6 g/10 min.

When HLMFR is less than 1 g/10 min, extrusion output is insufficient at the time of extrusion molding of the parison (a pipe-like fused polymer extruded from the base of the molder in blow molding, the state before being expanded by pneumatic pressure in the mold), and molding becomes unstable and so not practicable. While when HLMFR exceeds 10 g/10 min, the melt viscosity and melt tension of the parison are insufficient, and molding becomes unstable, accordingly not practicable. HLMFR can be adjusted in polymerization by the method of controlling polymerization temperature and hydrogen concentration. For example, HLMFR can be heightened by increasing the hydrogen concentration. HLMFR is measured in conformity with JIS K-7210 by the condition of temperature of 190° C. and load of 21.6 kg.

(2) Density

The density of the ethylene-based polymer of the invention is in the range of 0.940 to 0.960 g/cm$^3$, preferably 0.943 to 0.958 g/cm$^3$, and more preferably 0.946 to 0.955 g/cm$^3$. When the density is less than 0.940 g/cm$^3$, the stiffness of the molded product of hollow plastic is insufficient, while when it exceeds 0.960 g/cm$^3$, the molded product of hollow plastic is short of the stiffness. The density can be regulated in polymerization by the method of selecting the kind of α-olefin and controlling the content. For example, the density can be heightened by lowering the content of α-olefin in the polyethylene (lowering the addition amount of α-olefin at the time of polymerization), or using an α-olefin having a small carbon atom number when the content is the same. The density is measured in conformity with JIS K-7112 by melting pellets at a temperature of 160° C. with heat compression molding machine, lowering the temperature at a rate of 25° C./min to mold a sheet having a thickness of 2 mmt, and subjecting the sheet to conditioning in a room at a temperature of 23° C. for 48 hours, and put in a density gradient tube for measurement.

(3) Molecular Weight Distribution (Mw/Mn)

The molecular weight distribution (Mw/Mn) obtained by measurement by means of gel permeation chromatography (GPC) of the ethylene-based polymer of the invention is in the range of 25 or more. The least upper bound of Mw/Mn is generally 50. When Mw/Mn is less than 25, the molecular weight distribution is too narrow and durability lowers. While when Mw/Mn exceeds 50, low molecular weight component increases too much and impact resistance lowers. The measuring method of GPC is as described in the Example.

(4) Strain Hardening Parameter of Elongation Viscosity (λmax)

The strain hardening parameter (λmax) obtained by the measurement of elongation viscosity of the ethylene-based polymer of the invention is in the range of 1.05 to 1.50. This λmax is correlative to a long branched chain number, and when λmax is big, the long branched chain number increases. Also, the long branched chain number in an ethylene-based polymer is correlative to moldability, and when a long branched chain increases, the moldability is bettered. However, when a long branched chain increases, a creep resisting property shows a tendency to be inferior, that is, a reverse correlation to moldability. When λmax is less than 1.05, molding failure is generated due to inferior moldability and there is a high possibility that a hollow plastic product cannot be molded. While when λmax exceeds 1.50, durability is decreased, although the moldability of the molded product of hollow plastic is bettered. The measuring method of a λmax is as described in the Example.

(5) Charpy Impact Strength

The ethylene-based polymer according to the invention has Charpy impact strength in the range of 7 kJ/m$^2$ or more, and preferably in the range of 8 kJ/m$^2$ or more. When the Charpy impact strength is less than 7 kJ/m$^2$, the molded product of hollow plastic is short of impact resistance. The least upper bound of Charpy impact strength is not especially restricted, but is generally 30 kJ/m$^2$ or less. The measuring method of Charpy impact strength is as described in the Example.

(6) Tensile Impact Strength

The ethylene-based polymer according to the invention has tensile impact strength of 130 kJ/m$^2$ or more, and preferably in the range of 135 kJ/m$^2$ or more. When the tensile impact strength is less than 130 kJ/m$^2$, the impact strength of the molded product of hollow plastic is insufficient. The least upper bound of the tensile impact strength is not especially restricted. The measuring method of tensile impact strength is as described in the Example.

(7) Swell Ratio (SR)

The ethylene-based polymer according to the invention has a swell ratio of 50 to 65%, preferably 50 to 60%, and most preferably in the range of 50 to 55%. When the swell ratio is less than 50%, the moldability of the molded product of hollow plastic is insufficient. While when the swell ratio exceeds 65%, irregularity of the molded product increases and surface smoothness lowers. The measuring method of a swell ratio is as described in the Example.

(8) Rupture Time in Full Notch Creep Test

The ethylene-based polymer according to the invention has rupture time in the full notch creep test of 40 hours or more. When the rupture time is less than the greatest lower bound, the durability of the molded product of hollow plastic is insufficient. The measuring method of creep resistance by the full notch creep test is as described in the Example.

[II] Manufacturing Method of Ethylene-Based Polymer

A chromium catalyst for ethylene polymerization and a polymerization method are described in detail below.

<Chromium Catalyst for Ethylene Polymerization>

The catalyst for use in the manufacturing method of the ethylene-based polymer of the invention is a chromium catalyst which comprises a specific inorganic oxide support (a) and a chromium compound (b) supported on the inorganic oxide support (a), and is obtained by calcining for activation of the support in a non-reducing atmosphere to thereby make at least a part of the chromium atoms hexavalent. The catalyst for use in the invention is a catalyst classified as a Phillips catalyst.

General Phillips catalysts are described in, for example, the following documents and the invention relates to the improvements of these catalysts.

(i) M. P. McDaniel, Advances in Catalysis, Vol. 33, page 47, 1985, Academic Press Inc.

(ii) M. P. McDaniel, Handbook of Heterogeneous Catalysis, page 2,400, 1997, VCH (iii) M. B. Welch et al., Handbook of Polyolefins: Synthesis and Properties, page 21, 1993, Marcel Dekker 1. Inorganic Oxide Support (a)

In the invention, as inorganic oxide support (a), the metal oxides belonging to group 2, 4, 13 or 14 of the Periodic Table can be used. Specifically, magnesia, titania, zirconia, alumina, silica, thoria, silica-titania, silica-zirconia, silica-alumina, and mixtures of these metal oxides are exemplified.

However, for the use of the fuel tank of an automobile excellent both in durability (FNCT and the like) and impact resistance, it is preferred to use silica alone as the inorganic oxide support. When those other than silica are used as the support, there is a case where polymerization activity lowers, or there is a possibility that low molecular weight components in the polyethylene polymer increase and impact resistance is decreased.

The manufacturing methods, physical properties and characteristics of these chromium catalysts are described in, for example, the following documents.

(i) C. E. Marsden, Preparation of Catalysts, Vol. V, page 215, 1991, Elsevier Science Publishers (ii) C. E. Marsden, Plastics, Rubber and Composites Processing and Applications, Vol. 21, page 193, 1994

The chromium catalyst for ethylene polymerization in the invention has a high specific surface area, a high pore volume, characteristic properties and structure as the catalytic particle. The characteristic properties and structure can be attained by controlling the particulate structure and the pore structure in the particle and the like of the inorganic oxide support to be used in a high degree.

In the invention, as inorganic oxide support (a), it is sufficient to select an inorganic oxide support having a specific surface area of 625 to 1,000 m$^2$/g, preferably 650 to 950 m$^2$/g, and more preferably 700 to 900 m$^2$/g. When the specific surface area is less than 625 m$^2$/g, the activity of the catalyst prepared by activation at a low temperature, for example, 250° C. to 550° C., lowers. While when the specific surface area exceeds 1,000 m$^2$/g, the support is difficult to be manufactured.

The pore volume of inorganic oxide support (a) of the invention is in the range of 1.0 to 5.0 cm$^3$/g, preferably 1.0 to 3.0 cm$^3$/g, and more preferably in the range of 1.2 to 2.5 cm$^3$/g. In the case where the pore volume is less than 1.0 cm$^3$/g, the pore is lessened at the time of polymerization according to the polymerized polymer and the monomer cannot be diffused, as a result activity lowers. While when the pore volume exceeds 5.0 cm$^3$/g, it is difficult to manufacture the support.

The average particle size of inorganic oxide support (a) of the invention is preferably in the range of 10 μm to 200 μm, more preferably 25 μm to 180 μm, and still more preferably in the range of 35 μm to 170 μm. When the average particle size is out of the above range, it becomes difficult to keep the balance of durability and impact resistance of the obtained ethylene-based polymer (the blow-molded final product).

The specific surface area and pore volume of inorganic oxide support (a) can be measured by the following method.

After sufficient pretreatment by heating under reduced pressure, inorganic oxide support (a) is subjected to measurement of adsorption isothermal line of nitrogen under the liquid nitrogen temperature by using Autosorb 3B (manufactured by Quantachrome Instruments). The pore volume can be computed from the adsorbed amount at relative pressure 0.95 of the adsorption isothermal line obtained by measurement, and the specific surface area can be computed by BET multipoint analysis. Further, the average pore size can be computed by the following equation (1) by taking the pore structure as a cylinder. In equation (1), Dave indicates an average pore size, Vtotal is a pore volume, and SBET is a specific surface area by a BET multipoint method.

$$Dave = 4Vtotal/SBET \quad \text{Equation (1)}$$

Further, a pore capacity in the specified range can be computed by finding meso-pore distribution by BJH analysis.

In the invention, as described above, the manufacturing method of inorganic oxide support (a) is not especially restricted and, for example, a method of manufacturing by spray granulation of mixed slurry of silica particles is exemplified.

The particulate structure of the obtained inorganic oxide support (a) can be regulated by arbitrary selecting conventionally known spray granulation conditions, such as the diameter of a nozzle at spray granulation, a spray speed, the concentration of a material, and the composition of a material. As an example capable of obtaining a silica having a high specific surface area and a high pore volume by employing such a manufacturing method, the method disclosed in U.S. Pat. No. 5,232,883 is exemplified.

2. Chromium Compound (b)

In the invention, inorganic oxide support (a) carries chromium compound (b). Chromium compound (b) may be any compound so long as a part of the chromium atoms of which is capable of becoming hexavalent by calcining for activation in a non-reducing atmosphere after being carried. The examples of chromium compound (b) include, for example, chromium oxide, chromium halide, oxyhalide, chromate, bichromate, nitrate, carboxylate, sulfate, chrome-1,3-diketo compound, and chromic acid ester.

The specific examples of chromium compound (b) include chromium trioxide, chromium trichloride, chromyl chloride, potassium chromate, ammonium chromate, potassium bichromate, chromium nitrate, chromium sulfate, chromium acetate, chromium tris(2-ethylhexanoate), chromium acetyl acetonate, and bis(tert-butyl)chromate. Of these compounds, chromium trioxide, chromium acetate and chromium acetyl acetonate are preferred. Even when a chromium compound having an organic group such as chromium acetate or chromium acetyl acetonate is used, the organic group moiety is baked by calcining for activation in a non-reducing atmosphere described later, and the chromium compound is finally reacted with the hydroxyl group on the surface of the inorganic oxide support similarly to the case where a chromium trioxide is used, and at least a part of the chromium atoms becomes hexavalent and fixed as the chromic acid ester structure. This fact is described in, for example:
(i) V. J. Ruddick et al., J. Phys. Chem., Vol. 100, page 11062 (1996)
(ii) S. M. Augustine et al., J. Catal., Vol. 161, page 641 (1996)

Chromium compound (b) can be carried by inorganic oxide support (a) by known methods such as immersion, distillation of solvent and sublimation. The method may be arbitrarily selected depending upon the kind of the chromium compound to be used. At that time, the carried amount of chromium compound (b) is preferably 0.5 to 5.0% by weight to the support as chromium atom, more preferably 0.6 to 4.0% by weight, and still more preferably 0.7 to 3.0% by weight.

3. Hydrocarbon Compound Containing Metal Other than Chromium (c)

In manufacturing the ethylene-based polymer of the invention, for regulating ethylene polymerization activity, a copolymerization property with α-olefin, the molecular weight and the molecular weight distribution of the ethylene-based polymer to be obtained, it is preferred for inorganic oxide support (a) to support hydrocarbon compound (c) containing a metal other than chromium before supporting a chromium compound, or after supporting a chromium compound, or at the same time with a chromium compound. The metal element is selected from group 1, group 2, group 3 and group 13 of the Periodic Table. Of these metal elements, aluminum is most preferred. The number of carbon atoms contained in 1 molecule of the metal-containing hydrocarbon compound is 2 to 30, and the number of hydrogen atoms is 5 to 100.

As the specific examples of the hydrocarbon compounds (c) containing a metal other than chromium, for example, an aluminum compound such as aluminum tri-sec-butoxide, a titanium compound such as titanium tetraisopropoxide, a zirconium compound such as zirconium tetrabutoxide, and a magnesium compound such as dialkyl magnesium are exemplified. For regulating a copolymerization property with α-olefin, the molecular weight and the molecular weight distribution of the polyethylene to be obtained, aluminum tri-sec-butoxide is preferably used.

These methods are described, for example, in the following documents.
(i) C. E. Marsden, Plastics, Rubber and Composites Processing and Applications, Vol. 21, page 193 (1994)
(ii) T. Pullukat et al., J. Polym. Sci., Polym. Chem. Ed., Vol. 18, page 2857 (1980)
(iii) M. P. McDaniel et al., J. Catal., Vol. 82, page 118 (1983)

The amount of each metal in hydrocarbon compounds (c) containing a metal other than chromium contained in the catalyst is preferably 0.5 to 5.0% by weight, more preferably 0.7 to 4.5% by weight, and still more preferably 0.9 to 4.0% by weight. The sum total of the carbon and hydrogen contained in the catalyst is preferably 0.5 to 20.0% by weight, and more preferably 0.5 to 15.0% by weight.

In the invention, catalyst precursor (d) comprising an inorganic oxide support and a chromium compound and an aluminum compound supported on the inorganic oxide support is preferably used. Incidentally, to treat the support with an aluminum compound after activation, that is, an embodiment of a chromium compound/aluminum compound-supported catalyst which carries an aluminum compound after activation is not preferred for the following reason.

In the aspect of the expense of the catalyst, it costs for the treatment of an aluminum compound in addition to the expense of a usual Phillips catalyst, accordingly, the catalyst cost becomes expensive. In addition, in the aspect of the equipments of catalysts, for the treatment of aluminum compound in a plant scale, equipments of the plant capable of supporting reaction of aluminum compound and solvent drying are necessary. Further, since the chromium catalyst having been subjected to calcining for activation is easily inactivated by oxygen and water, it is necessary to preserve the catalyst in an inert atmosphere such as nitrogen or argon, and the operation of the treatment of aluminum compound in a plant scale is not easy.

In the invention, for the purpose of regulating the polymerization activity of the ethylene, the copolymerization property with α-olefin, and the molecular weight and molecular weight distribution of the ethylene-based polymer to be obtained, fluorine-containing salts and the like, such as ammonium silicofluoride, may be carried before supporting a chromium compound, or after supporting a chromium compound, or at the same time with a chromium compound.

4. Method of Calcining for Activating (Activation)

Calcining for activation can be performed in a non-reducing atmosphere substantially free from water content, for example, in oxygen or air. At this time, inert gas may coexist. Calcining for activation is preferably performed by flowing molecular sieves or the like and using sufficiently dried air in a fluidized state. As shown in FIG. 9 in M. P. McDaniel, Advances in Catalysis, Vol. 33, page 47, 1985, Academic Press Inc., it is generally known that catalytic activity reveals at an activation temperature of 500° C. or higher. In particular, it is shown in the Fig. that high activity is realized at an activation temperature of 800 to 900° C., and such an activation condition is the technical common sense in the industry.

As the reactor for performing calcining for activation, a method of activation of a chromium catalyst in bench/plant scale is disclosed in the Example of U.S. Patent Publication 2005/0255987. Further, the examples of the shape and size of a plant scale activation reactor are described in H. Schonfelder et al., Reaction Kinetics and the Development of Catalytic Processes, Vol. 122, page 255.

Calcining for activation of an inorganic oxide support containing a chromium compound is conventionally performed in a non-reducing atmosphere or in an inert gas atmosphere by raising the temperature in the oven from room temperature. For removing physically adsorbed water contained in an inorganic oxide support, it is a preferred method to increase a contact temperature from room temperature by inert gasification and change to a non-reducing atmosphere at a temperature on route to reach an objective contact temperature. When oxygen is present in such a state that the contact temperature is increased, since heat generation occurs due to combustion by the carbon and hydrogen in the chromium compound, the contact temperature steeply increases and it becomes difficult to control the contact temperature. The effect of the increase of the contact temperature due to combustion of the hydrocarbon becomes further conspicuous when a metal-containing hydrocarbon compound other than the chromium compound is contained.

"Contact temperature" here is a temperature obtained by measuring a fluidized bed of a catalyst and it means that the catalyst is in contact with the gas at this temperature. Since the temperature distribution of the fluidized bed of a catalyst is constant, any point of the fluidized bed of a catalyst may be measured, but it is preferred to adopt the temperature of the center of the fluidized bed of a catalyst.

The invention includes a process of performing calcining of catalyst precursor (d) supporting a chromium compound while regulating the concentration of oxygen to be introduced so as to maintain the contact temperature at 200° C. to 500° C. By regulating the oxygen concentration, the increase of the contact temperature due to combustion of the hydrocarbon part contained in the catalyst can be restrained and the contact temperature is maintained in the above range. By ethylene polymerization with the catalyst obtained by this method, a polyethylene having good flowability and melt tension can be manufactured even at a low calcining temperature.

In the invention, calcining for activation is performed at 250° C. to 550° C., preferably at 275° C. to 530° C., and more preferably at 300° C. to 500° C., specifically at 300° C. to 425° C. preferably for 30 minutes to 48 hours, more preferably 1 hour to 36 hours, and still more preferably 2 hours to 24 hours. By this calcining for activation, at least a part of the chromium atoms of the chromium compound carried by the inorganic oxide support is oxidized as hexavalent and chemically fixed on the support. When calcining for activation is performed with a conventional chromium-supported catalyst at a temperature of less than 550° C., polymerization activity steeply lowers, but the catalyst in the invention maintains high activity even at a temperature of less than 550° C.

Incidentally, in the invention, when calcining for activation is performed at a temperature of less than 250° C., polymerization activity lowers and when calcining for activation is performed at a temperature exceeding 900° C., sintering occurs and activity lowers. Further, when calcining for activation is performed at a temperature exceeding 550° C., the molecular weight distribution of the polymer becomes narrow, and durability lowers, although impact strength is improved, accordingly, not suitable for a fuel tank of an automobile.

There is exemplified in U.S. Pat. No. 5,232,883 (Example 1) polymerization by a catalyst activated at a high activation temperature of 800° C. or higher by making a silica to support a chromium compound having a very large specific surface area of 700 m²/g or more and a relatively big pore volume of about 1.6 cm³/g, but there is no information that the catalyst is a catalyst having high activity even obtained by a low activation temperature.

U.S. Pat. No. 3,978,002 discloses that when a Phillips catalyst is manufactured by using silica having a large specific surface area and a pore volume as the support, the activity increases (Tables I and II). However, the activation temperature of the Phillips catalyst shown in the patent specification is as high as 600° C. or more, and there is no such a large difference in the effect concerning the improvement of activity.

On the other hand, the invention can show high polymerization activity even with the catalyst obtained by activating the support having a specific surface area and pore volume by a low temperature of 250° C. to 550° C. When a Phillips catalyst activated at a low temperature is used, an ethylene-based polymer having a widened range of molecular weight can be obtained, therefore, the ethylene-based polymer obtained according to the method of the invention is excellent in durability.

In the next place, the manufacturing method (method of activation) of the chromium catalyst for ethylene polymerization is specifically described.

(1) First Process: Calcining Process in an Inert Atmosphere

The first process is a process for performing calcining in an inert atmosphere. Temperature rising is initiated from room temperature in an inert atmosphere. The contact temperature is raised to an arbitrary temperature between 100° C. to 360° C. The contact temperature is preferably 120° C. to 320° C., and more preferably 140° C. to 250° C. The contact temperature may be raised continuously, or the temperature may be held at a certain temperature and then raised stepwise, or the contact temperature may be lowered temporarily. The method of raising the contact temperature is not especially restricted. The time continuously maintaining the contact temperature at 100° C. to 360° C. in an inert atmosphere is 5 minutes to 48 hours, preferably 30 minutes to 36 hours, and especially preferably 1 hour to 24 hours. The temperature rising rate in raising the contact temperature is not especially restricted, but is 1° C. to 200° C./hr, preferably 5° C. to 150° C./hr, and more preferably 10° C. to 100° C./hr.

(2) Second Process: Process of Performing Calcining with Regulating Oxygen Concentration The second process is a process of performing calcining with regulating oxygen concentration. From the initiation of the introduction of oxygen to the termination of the regulation of oxygen concentration is the second process. When oxygen is introduced into the catalyst before activation baked in an inert atmosphere, the catalyst is combusted by oxygen and the contact temperature rises. Oxygen is introduced so as to reach the contact temperature of 200° C. to 500° C., preferably 250° C. to 480° C., and more preferably 280° C. to 430° C. When the contact temperature exceeds 500° C., the content of the hexavalent chromium decreases, and the polyethylene of the invention improved in flowability and melt tension cannot obtained. The oxygen concentration at the time of initiation of oxygen introduction is preferably 2% or less, and more preferably 1% or less. The contact temperature at the time of initiation of oxygen introduction is 200° C. to 450° C., preferably 250° C. to 420° C., and more preferably 300° C. to 400° C. The concentration of oxygen is raised and the oxygen concentration at terminal time of the process is preferably 5% to 50%, more preferably 10% to 40%, and still more preferably 15% to 30%. Specifically, it is most preferred that air is introduced at the terminal time of the process. The time of this process to perform calcining with regulating oxygen concentration is preferably 5 to 72 hours. In increasing the concentration of oxygen to be introduced, the concentration of oxygen may be continuously raised, or may be raised stepwise, or the concentration of oxygen may be temporarily lowered. Intermission and initiation of gas flow may be repeated (intermittently). Also, the contact temperature may be held at a desired certain temperature, or may be raised gradually. The temperature rising rate in raising the contact temperature is not especially restricted, but is 1° C. to 200° C./hr, preferably 5° C. to 150° C./hr, and more preferably 10° C. to 100° C./hr. There is no particular restriction between the oxygen concentration of oxygen and inert gas mixture and the contact temperature.

The specific contact temperature of the second process and the specific regulating method of the introduced oxygen concentration are shown below.

1. Oxygen concentration is raised gradually stepwise while holding low temperature. For example, in the state of holding the temperature at a desired contact temperature between 250° C. and 370° C., oxygen concentration is gradually increased (for example, 1% at a time).
2. Oxygen concentration is raised gradually and continuously while holding low temperature. For example, in the state of holding the temperature at a desired contact temperature between 250° C. and 370° C., oxygen concentration is continuously increased (for example, at a temperature rising rate of 1%/hr).
3. Low temperature holding is divided to two stages and the oxygen concentration is gradually increased in each stage. For example, in the state of holding the temperature at a desired contact temperature between 250° C. and 320° C., oxygen concentration is gradually increased (for example, 1% at a time). After that, the temperature is raised to a desired contact temperature between 320° C. and 370° C., and in the state of holding the temperature, oxygen concentration is further stepwise increased (for example, 1% at a time).
4. Low temperature holding is subdivided to multistage and the temperature is gradually raised at low oxygen concentration. For example, in the state of holding the temperature at a desired contact temperature between 250° C. and 300° C., oxygen concentration is gradually increased (for example, 0.5% at a time). After that, the temperature is raised to a desired contact temperature between 300° C. and 350° C., and in the state of holding the temperature, oxygen concentration is further stepwise increased (for example, 0.5% at a time). After that, the temperature is raised to a desired contact temperature between 350° C. and 370° C., and in the state of holding the temperature, oxygen concentration is further stepwise increased (for example, 0.5% at a time). After that, the temperature is raised to a desired contact temperature between 375° C. and 400° C., and in the state of holding the temperature, oxygen concentration is further stepwise increased (for example, 0.5% at a time).

When chromium trioxide is used as the chromium compound, the reaction caused by the activation operation is shown below.

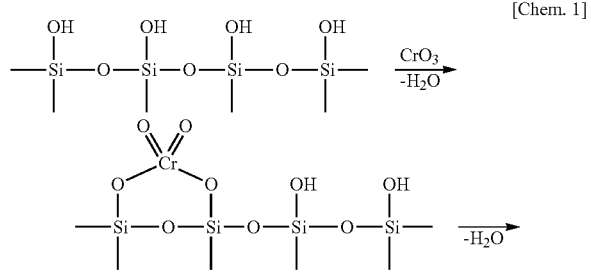

[Chem. 1]

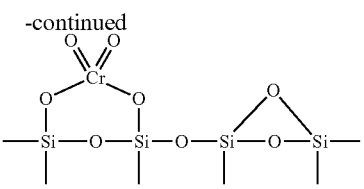

-continued

The silanol group on the surface of the silica is reacted with chromium trioxide to become a chromic acid ester structure, and dehydration of the silanol group is caused by activation at a further high temperature. Even when a chromium compound such as chromium acetate or tris (acetylacetonato)chromium is used as the chromium compound, the organic group moiety such as a carboxyl group or an acetylacetonato group is combusted by the activation in the presence of oxygen, and finally becomes a chromium ester structure similarly to the case of chromium trioxide. This chromium ester structure is considered to be a precursor before activation in performing ethylene polymerization. However, the ester structure becomes $CrO_3$ by reacting with water to cause hydrolysis, and reaction of $CrO_3 \rightarrow Cr_2O_3 + 3/2O_2$ occurs and becomes inert chromium(III) oxide ($Cr_2O_3$). Accordingly, in performing activation, sufficient care should be taken in controlling moisture of the flowing gas (the dew point of flowing gas is preferably −80° C. or less).

In the invention, in performing activation of a chromium catalyst at a low temperature of 250° C. to 550° C., by regulating the oxygen concentration so that excessive contact temperature rising spike is not caused by the combustion of the hydrocarbon moiety contained in the catalyst, polyethylene improved in flowability and moldability is obtained. On analyzing the valence number of chromium of the chromium catalyst obtained after activation, it has been found that the catalyst having been subjected to contact temperature rising spike is little in the proportion of hexavalent chromium as compared with the catalyst not subjected to temperature spike. The reason for this fact is thought as follows. In activation, dehydration reaction of the silanol group is caused as described above. The dehydration reaction rapidly progresses due to the contact temperature rising and the moisture content exceeding the moisture removing ability by the flowing gas remains in the catalyst system. As a result, the dehydration reaction of the chromic acid ester structure is caused. It is considered that the difference in the properties of the catalysts makes the difference in the characteristics of the polyethylenes obtained by polymerization. The content of hexavalent chromium in the invention is preferably 70% to 100%, and more preferably 75% to 100%.

(3) Third Process: Calcining for Activation in Constant Oxygen Concentration

After the second process, in the state of holding the oxygen concentration introduced at the time of termination, calcining for activation is performed at a contact temperature of 250° C. to 550° C. for 5 minutes to 72 hours, preferably for 30 minutes to 54 hours, and more preferably 1 hour to 36 hours. The contact temperature in this process is preferably 300° C. to 500° C., more preferably 320° C. to 450° C., and still more preferably 350° C. to 420° C. By this calcining for activation, at least a part of the chromium atoms of the chromium compound carried by the inorganic oxide support is oxidized to hexavalent and chemically fixed on the support. When activation is performed at a temperature exceeding 500° C., the effects of the improvement of flowability and melt tension of the invention are not exhibited. Further, when the temperature of activation is less than 300° C., sufficient catalyst activity cannot be obtained. The temperature rising rate at the time of increasing the contact temperature is not especially restricted, but is 1° C. to 200° C./hr, preferably 5° C. to 150° C./hr, and more preferably 10° C. to 100° C./hr.

As described above, the proportion of the hexavalent chromium after termination of calcining to the gross chromium content in the chromium-supported catalyst obtained by the invention is 70% to 100%. The chromium content at this time is the content obtained by ICP measurement.

<Polymerization Method>

In the invention, an ethylene-based polymer is manufactured by using a chromium catalyst obtained by calcining for activation (activation) at a relatively low temperature by performing ethylene homopolymerization or copolymerization of ethylene and α-olefin.

In manufacturing an ethylene-based polymer, any polymerization method of liquid phase polymerization such as slurry polymerization and solution polymerization, and vapor phase polymerization may be adopted.

Liquid phase polymerization is usually performed in a hydrocarbon solvent. As the hydrocarbon solvent, inert hydrocarbon is used alone or as mixture, such as propane, n-butane, isobutene, n-pentane, isopentane, hexane, heptanes, octane, decane, cyclohexane, benzene, toluene, xylene and the like.

As vapor phase polymerization, usually known polymerization method such as a fluidized bed and a stirring bed may be adopted in the coexistence of inert gas, and according to circumstances, it is also possible to adopt what is called a condensing mode where a medium for removing polymerization heat coexists.

The polymerization temperature in liquid phase or vapor phase polymerization is generally 0° C. to 300° C., practicably 20° C. to 200° C., preferably 50° C. to 180° C., and more preferably 70° C. to 150° C. The catalyst concentration and ethylene concentration in a reactor may be arbitrary concentration sufficient to progress polymerization. For example, the catalyst concentration in the case of liquid phase polymerization can be in the range of about 0.0001% by weight to about 5% by weight on the basis of the weight of the content in the reactor. Similarly, the ethylene concentration in the case of vapor phase polymerization can be in the range of 0.1 MPa to 10 MPa as total press.

The concentration ratio or partial pressure ratio of hydrogen coexisting with ethylene and ethylene can be easily regulated by changing the concentrations and partial pressures of hydrogen and ethylene. Since hydrogen also functions as a chain transfer agent, when the concentration ratio (Hc/ETc) or the partial pressure ratio (Hp/ETp) is changed, for obtaining the final product having the same HLMFR, the polymerization temperature has to be changed also. That is, when Hc/ETc or Hp/ETp is increased, the polymerization temperature has to be decreased, and when Hc/ETc or Hp/ETp is decreased, the polymerization temperature has to be increased. However, it depends upon the absolute value of the hydrogen concentration or the partial pressure, for obtaining the final product having the same HLMFR, it is not always necessary to change the polymerization temperature.

In polymerizing ethylene by the method of the invention, it is preferred to copolymerize α-olefin as the comonomer. As the α-olefin, for example, alone or two or more kinds of propylene, 1-butene, 1-hexene, 4-methyl-1-pentene, and 1-octene are introduced into a reactor for polymerization. Preferably 1-butene and 1-hexene, and more preferably 1-hexene is preferably as the comonomer. The content of α-olefin in the ethylene-based polymer to be obtained (a polyethylene-based resin) is 15 mol % or less, and preferably 10 mol % or less.

It is also preferred for the obtained ethylene-based polymer to be kneaded subsequently. Kneading is performed with a monoaxial or biaxial extruder or a continuous kneader. The ethylene-based polymer manufactured by the above method may be used alone, or two or more kinds may be used as mixture. The ethylene-based polymer may be pelletized according to a usual method by mechanically melting and blending by means of a pelletizer or homogenizer, and then molded by various kinds of molders to thereby obtain a desired molded product. By making the most of extremely good powdery particulate properties of the ethylene-based polymer particles manufactured by the method of the invention, it is also possible to mold a desired molded product by directly feeding the polymer powder to every kind of molder without going through pelletizing operation. The fact that a process of pelletization can be omitted is very preferred in the viewpoint of energy saving.

The ethylene-based polymer particles manufactured by the method of the invention mean the state holding the form of the polymer particles just after manufacture of the ethylene-based polymer by using the catalyst for ethylene polymerization in the polymerization reaction tank, which are ethylene-based polymer particles in the state of not being treated at a temperature of 150° C. or so necessary to dry and distill off the solvents and the like after termination of polymerization reaction, preferably a temperature of 130° C. or so, and more preferably a temperature of 110° C. or so.

The bulk density of the ethylene-based polymer particles of the invention is preferably 0.20 to 0.60 $g/cm^3$, more preferably 0.22 to 0.55 $g/cm^3$, and still more preferably 0.25 to 0.50 $g/cm^3$. Further, the particles passing through a sieve having an aperture size of 177 μm are 0.8% by weight or less of the entire particles, preferably 0.5% by weight or less, and more preferably 0.3% by weight or less. It is a matter of course that the greatest lower bound is 0% by weight. When particles passing through a sieve having an aperture size of 40 μm are more than 0.8% by weight of the entire particles, contamination by diffusion of dust at the time of carrying by air, and adhesion to the container wall by static electricity is severe, and so not preferred.

One or two or more known additives can be compounded into the ethylene-based polymer and the ethylene-based polymer particles, if necessary, according to ordinary methods, in addition to other olefin-based polymers and rubbers, such as an antioxidant (phenol-based, phosphorus-based, sulfur-based), a UV absorber, a light stabilizer, a lubricant, an antistatic agent, a defogging agent, an anti-blocking agent, a processing assistant, a coloring pigment, a pearl pigment, a polarizing pearl pigment, a crosslinking agent, a foaming agent, a neutralizer, a heat stabilizer, a crystalline nucleus agent, an inorganic or organic filler, a fire retardant, and the like.

As the fillers, calcium carbonate, talc, metal powder (e.g., aluminum, copper, iron, lead, etc.), silica rock, diatomaceous earth, alumina, gypsum, mica, clay, asbestos, graphite, carbon black, titanium oxide, etc., can be used. In any case, each additive can be compounded into the polyethylene-based resin according to necessity, kneaded with a kneading extruder, a Banbury mixer or the like to obtain a material for molding.

According to the polymerization method of the invention, polymerization is carried out with high activity and molded products of the same specification can be stably and continuously produced. Accordingly, the polymerization method of the ethylene-based polymer of the invention is an excellent method suitable for the continuous production of polyethylene-based resins having a constant quality.

As the polymerization method of the invention, not only single stage polymerization for manufacturing an ethylene-based polymer using one reactor but also multi-stage polymerization connecting at least two reactors for broadening the molecular weight distribution can be performed. In the case of multi-stage polymerization, two-stage polymerization is preferred, which comprises connected two reactors and the reaction mixture obtained by polymerization in the first stage reactor is subsequently continuously supplied to the second stage reactor. The transfer from the first stage reactor to the second stage reactor is performed by continuous discharge of the reaction mixture from the first stage reactor through a connecting hose by differential pressure.

Any method of manufacturing a high molecular weight component in the first stage reactor and a low molecular weight component in the second stage reactor, or a low molecular weight component in the first stage reactor and a high molecular weight component in the second stage reactor may be used, but a method of manufacturing a high molecular weight component in the first stage reactor and a low molecular weight component in the second stage reactor is preferred from the aspect of productivity for the reason that the intermediate flash tank of hydrogen in transfer from the first stage to the second stage is not necessary.

In the first stage, polymerization of ethylene alone or, if necessary, copolymerization with α-olefin is performed, while regulating the molecular weight by the weight ratio or the partial pressure ratio of hydrogen concentration to the ethylene concentration (Hc/ETc or Hp/ETp), polymerization temperature, or by both of them, and polymerization reaction is performed while regulating the density by the weight ratio or the partial pressure ratio of α-olefin concentration to the ethylene concentration.

In the second stage, there are hydrogen in the reaction mixture flowed in from the first stage and also α-olefin, but if necessary, new hydrogen and α-olefin may be respectively added. Accordingly, also in the second stage, polymerization can be performed while regulating the molecular weight by the weight ratio or the partial pressure ratio of hydrogen concentration to the ethylene concentration (Hc/ETc or Hp/ETp), polymerization temperature, or by both of them, and polymerization reaction is performed while regulating the density by the weight ratio or the partial pressure ratio of α-olefin concentration to the ethylene concentration.

[III] Hollow Molded Product

The hollow molded product of the invention has a structure having at least one layer comprising the ethylene-based polymer of the invention, or a structure preferably having multilayer, but may be a single layer structure of the ethylene-based polymer of the invention. When the hollow molded product has a multilayer structure, it is preferred to have a permeation-reducing cut-off layer, and a barrier layer is usually used as the hollow molded product.

When the layer structure of the hollow molded product of the invention comprises two or more layers, the innermost layer and the outermost layer preferably consist of the ethylene-based polymer of the invention.

It is preferred that the hollow molded product of the invention has at least one barrier layer to reduce permeation of a volatile material, and the barrier layer has a multilayer structure including a permeation-reducing cut-off layer constituted of a polar cut-off polymer. For example, when the wall of a plastic fuel tank is formed of a multilayer structure, there is such an advantage that a barrier layer can be fixed between two layers comprising the ethylene-based polymer of the invention (when the barrier layer is used alone, moldability and mechanical strength are not sufficient). As a result, in particular, during co-extrusion blow molding, moldability of the material having two or more layers of the ethylene-based polymer of the invention is improved primarily by the influence of the improved moldability of the ethylene-based polymer of the invention. Further, the improved performance of the ethylene-based polymer of the invention exerts an extremely important influence upon mechanical strength of the material. Therefore, it becomes possible to conspicuously increase the strength of the hollow molded product of the invention.

In the hollow molded product of the invention, a base layer may be provided on the surface of the layer comprising the ethylene-based polymer of the invention by the treatment such as fluorination, surface covering, or plasma polymerization.

The hollow molded product of the invention is preferably a hollow molded product comprising four kinds 6 layers of innermost layer, an adhesive layer, a barrier layer, an adhesive layer, a regenerative material layer, and an outermost layer laminated in this order from the inner side. A barrier property of a high degree can be exhibited by sandwiching the barrier layer with the adhesive layers. By providing the regenerative material layer between the outermost layer and the adhesive layer, advantages such as cost down by the reduction of the cost of materials and the maintenance of stiffness of the hollow molded product are exhibited.

The structure of each layer and the layer structural ratio in the above embodiments are described in detail below.

(1) Layer Structure of Hollow Molded Product

1. Outermost Layer

Resin (A) constituting the outermost layer of the hollow molded product of the invention is the ethylene-based polymer of the invention manufactured by performing polymerization with the chromium catalyst for ethylene polymerization of the invention.

2. Innermost Layer

Resin (B) constituting the innermost layer of the hollow molded product of the invention is the ethylene-based polymer of the invention manufactured by performing polymerization with the chromium catalyst for ethylene polymerization of the invention, which may be the same with or different from the above resin (A).

3. Barrier Layer

Resin (C) constituting the barrier layer of the hollow molded product of the invention is a resin selected from an ethylene vinyl alcohol resin, a polyamide resin, a polyethylene terephthalate resin, and a polybutylene terephthalate resin, and is especially preferably an ethylene vinyl alcohol resin. The ethylene vinyl alcohol resin has a degree of saponification of preferably 93% or more, and more preferably 96% or more, and an ethylene content of preferably 25 mol % to 50 mol %.

4. Adhesive Layer

Resin (D) constituting the adhesive layer of the hollow molded product of the invention is a resin selected from high density polyethylene graft modified by unsaturated carboxylic acid or the derivatives thereof, low density polyethylene, and straight chain low density polyethylene, and is especially preferably high density polyethylene graft modified by unsaturated carboxylic acid or the derivatives thereof.

The content of the unsaturated carboxylic acid or the derivatives thereof in the adhesive layer is preferably 0.01% by weight to 5% by weight, more preferably 0.01% by weight to 3% by weight, and still more preferably 0.01% by weight to 1% by weight. When the content of the unsaturated carboxylic acid or the derivatives thereof is less than 0.01% by weight, sufficient adhesive performance is not exhibited, while when it exceeds 5% by weight, the unsaturated carboxylic acid which does not contribute to adhesive property adversely affects adhesive property.

5. Regenerative Material Layer

The resin constituting the regenerative material layer of the hollow molded product of the invention is a composition containing resin (A) constituting the outermost layer, resin (B) constituting the innermost layer, resin (C) constituting the barrier layer, and resin (D) constituting the adhesive layer.

As each component of resin (A) to resin (D), a new material may be used, alternatively the scrap of the multi-layer laminate containing each layer comprising the components of resin (A) to resin (D), and unnecessary parts such as burrs may be recovered and these recycled articles may be reused as the component material of each layer. For example, reground resins obtained by grinding molded product of hollow plastics (fuel tanks for automobiles and the like) once molded, used and discarded are used. When recycled articles are used, all the components of resin (A) to resin (D) may be supplied from the recycled articles, or the recycled articles may be mixed with new materials for use.

When burrs of molded products generated in manufacturing multilayer laminate and virgin parison are used as recycled articles, since there are cases where the compatibility of each component lowers, a compatibilizing agent or the resin constituting the adhesive layer may further be mixed.

6. Layer Structural Ratio of Hollow Molded Product

As the constitution of the thickness of each layer of the hollow molded product of the invention in thickness ratio, preferably the outermost layer is 10% to 30%, the innermost layer is 20% to 50%, the barrier layer is 1% to 15%, the adhesive layer is 1% to 15%, and the regenerative material layer is 30% to 60% (provided that the sum total of the structural ratio of all the layer thicknesses is 100%).

The layer structural ratio of the outermost layer is preferably 10% to 30% to the gross thickness of the hollow molded product, more preferably 10% to 25%, and still more preferably 10% to 20%. When the layer structural ratio of the outermost layer is less than 10%, the impact resistance is insufficient, while when it exceeds 30%, the molding stability of the hollow molded product is impaired.

The layer structural ratio of the innermost layer is preferably 20% to 50% to the gross thickness of the hollow molded product, more preferably 35% to 50%, and still more preferably 40% to 50%. When the layer structural ratio of the innermost layer is less than 20%, insufficient stiffness is actualized, while when it exceeds 50%, the molding stability of the hollow molded product is impaired.

The layer structural ratio of the barrier layer is preferably 1% to 15% to the gross thickness of the hollow molded product, more preferably 1% to 10%, and still more preferably 1% to 5%. When the layer structural ratio of the barrier layer is less than 1%, barrier performance is insufficient, while when it exceeds 15%, impact resistance is insufficient.

The layer structural ratio of the adhesive layer is preferably 1% to 15% to the gross thickness of the hollow molded product, more preferably 1% to 10%, and still more preferably 1% to 5%. When the layer structural ratio of the adhesive layer is less than 1%, adhering performance is insufficient, while when it exceeds 15%, insufficient stiffness of the hollow molded product is actualized The layer structural ratio of the regenerative material layer is preferably 30% to 60% to the gross thickness of the hollow molded product, more preferably 35% to 50%, and still more preferably 35% to 45%. When the layer structural ratio of the regenerative material layer is less than 30%, the molding stability of the hollow molded product is impaired, while when it exceeds 60%, impact resistance is insufficient.

(2) Manufacture of Hollow Molded Product, Final Products and Uses

The method for manufacturing the hollow molded product is not especially restricted and an extrusion blow molding method using conventionally known multilayer hollow molding machine is usually used. For example, a multilayer hollow molded product is manufactured by heating and melting the component resin of each layer with a plurality of extruders, extruding the molten parison with multilayer dies, putting the parison between metal molds, and blowing air into the inside of the parison.

Further, to the hollow molded product of the invention may be added known additives, if necessary, in the range of not damaging the object, for example, an antistatic agent, an antioxidant, a neutralizer, a lubricant, an anti-blocking agent, a defogging agent, an organic or inorganic pigment, a filler, an inorganic filler, a UV preventive, a dispersant, a weather resisting agent, a crosslinking agent, a foaming agent, and a fire retardant are exemplified as such additives.

As the uses of the molded product of hollow plastic of the invention, for example, a fuel tank of an automobile, various kinds of fuel tanks, a lamp oil can, a drum can, a chemical container, an agricultural chemical container, a solvent container, and various kinds of plastic bottles are exemplified, and it is most preferred to use as a fuel tank of an automobile.

The ethylene-based polymer manufactured in the invention is excellent in moldability and durability, and also excellent in the balance of impact resistance and stiffness, so that the ethylene-based polymer is especially suitable for molded product of hollow plastics, and both durability (FNCT and the like) and impact resistance are high and excellent in the balance of both characteristics. As the uses of molded product of hollow plastics, for example, a fuel tank, a lamp oil can, a drum can, a chemical container, an agricultural chemical container, a solvent container, and plastic bottles are exemplified. Suitable uses are fuel tanks and they can be especially preferably used as fuel tanks of automobiles.

EXAMPLES

The invention will be described in further detail with reference to examples and comparative examples to prove superiority of the invention and predominance in the structure of the invention, but the invention is by no means restricted to these examples.

<Measuring Method of Every Kind>

The measuring methods used in the Examples and Comparative Examples are as follows.

1. Measuring Method of Physical Properties of Support Particles (1) Measurement of Particle Size Distribution of Support Particles by Laser Diffraction Scattering Method Measurement was performed with the apparatus: model MICROTRAC MT3000II (manufactured by NIKKISO CO., LTD.), conditions of: refractive index: particles: 1.81, dispersion medium: 1.33 (an aqueous solution of 0.2% by weight sodium hexametaphosphate), and ultrasonic irradiation: 40 W for 120 seconds.

(2) Measurement of Specific Surface Area and Pore Volume

After sufficient pretreatment by heating under reduced pressure, each support sample was subjected to measurement of adsorption isothermal line of nitrogen under the liquid nitrogen temperature by using Autosorb 3B (manufactured by Quantachrome Instruments). The pore volume was computed from the adsorbed amount at relative pressure 0.95 of the adsorption isothermal line obtained by measurement, and the specific surface area was computed by BET multipoint analysis. Further, the average pore size was computed by the following equation (1) by taking the pore structure as a cylinder. In equation (1), Dave indicates an average pore size, Vtotal is a pore volume, and SBET is a specific surface area by a BET multipoint method.

$$Dave = 4Vtotal/SBET \quad \text{Equation (1)}$$

Further, a pore capacity in the specified range was computed by finding meso-pore distribution by BJH analysis.

2. Measuring Method of Physical Properties of Catalyst (1) Measurement of the Content of Hexavalent Chromium A catalyst sample was weighed out by 0.2 g and put in a beaker having a capacity of 100 mL, and extracted with 50 mL of ultrapure water for 30 minutes. After cooling, the filtrate was fixed at 100 mL, and the liquid was determined as the specimen with ICP apparatus.

3. Measuring Method of Physical Properties of Ethylene-Based Polymer (1) Melt Flow Rate Measurement was performed in conformity with JIS K6922-2 (1997), by a temperature of 190° C. and load of 21.6 kg, as a high load melt flow rate (melt flow rate).

(2) Density

Measurement was performed in conformity with JIS K6922-1 (1997).

(3) Molecular Weight Distribution

Molecular weight distribution (Mw/Mn) was found by measurement with gel permeation chromatograph (GPC). GPC measurement as shown below was performed to find number average molecular weight (Mn) and weight average molecular weight (Mw), from which molecular weight distribution (Mw/Mn) was computed.

[Measuring Conditions by Gel Permeation Chromatograph (GPC)]

Apparatus: model 150C (manufactured by Waters)
Column: Shodex-HT806M
Solvent: 1,2,4-trichlorobenzene
Temperature: 135° C.

Universal rating was performed by using monodispersed polystyrene fractions.

Concerning the molecular weight distribution shown by the ratio of Mw to Mn (Mw/Mn) (the greater the value of Mw/Mn, the broader is the molecular weight distribution), data of n-alkane and fractional straight chain polyethylene resin of Mw/Mn≤1.2 were applied to the equation of the molecular weight and the detector sensitivity described in Sadao Mori, Size Exclusion Chromatography (high performance liquid chromatography of polymers), page 96, published by Kyoritsu Shuppan Co., Ltd., and the sensitivity of molecular weight M shown by the following equation was found, and the found value of the sample was compensated for.

$$\text{Sensitivity of molecular weight } M = a + b/M$$

(wherein a and b are constants, a=1.032, b=189.2)

(4) Measurement of Elongation Viscosity and Elongation Viscosity Ratio (λmax)

A test piece was made by using CAPILLARY RHEOMETER (manufactured by Intesco Co.) at a temperature of 190° C. with a capillary of 3 mmφ×15 mmL and on the condition of a piston rate of 20 mm/min. Elongation viscosity was measured by using a Melten Rheometer (manufactured by Toyo Seiki Seisaku-Sho, Ltd.) on the condition of pre-heating for 15 minutes, a temperature at 170° C., and a strain rate of 0.1/s. In the viscosity growth curve obtained in both logarithmic graph of time t and elongation viscosity η, in the case where strain hardening occurs, there are a linear part and a non-linear part as shown in FIG. 1. With the ratio of the maximum elongation viscosity ηE,max of the non-liner part to the assumed viscosity ηL,max at the linear part at the time giving ηE,max being λmax, and this is taken as the index showing the size of the non-linearity at the elongation viscosity.

$$\lambda max = \eta E, max / \eta L, max$$

(5) Swell (HLMFR·SR)

After the strand extruded at the time of measurement of the above high load melt flow rate (HLMFR) was cooled and solidified, the diameter (D) of the strand at the position of 1.2 cm from the tip on the side from which the polymer began to come out was measured. Orifice diameter ($D_0$) for HLMFR measurement was used. HLMFR·SR (%) is defined by the following equation.

$$\text{HLMFR·SR (\%)} = (D - D_0)/D_0 \times 100$$

(6) Modulus of Elasticity in Flexure

Measurement was performed in conformity with JIS K7106 (2004) by using a stiffness meter (manufactured by Toyo Seiki Seisaku-Sho, Ltd.). Cantilever bending stress was measured at 60° C./min on the conditions of span distance of 30 mm, grip of 30 mm, and whole bending moment of 6 kgf·cm. Incidentally, the test piece was formed by melting a pellet by a heat compression molding machine at 160° C., and then raising the temperature at a rate of 25° C./min to form a sheet of 2 mm in thickness. The sheet was subjected to conditioning in a room at 23° C. for 48 hours, and punched with a dumbbell cutting tooth to obtain a test piece of 85 mm length and 15 mm width. It can be seen that modulus of elasticity in flexure which is the index of stiffness and density have a positive correlation.

(7) Charpy Impact Strength

A test piece of type 1 was manufactured in conformity with JIS K-7111 (2004), and Charpy impact strength was measured in dry ice/alcohol at −40° C. The direction of blow was edge-wise and the type of notch was type A (0.25 mm).

(8) Tensile Impact Strength

Measurement was performed in conformity with JIS K-7160 (2004) in dry ice/alcohol at −40° C.

(9) Rupture Time in Full Notch Creep Test

Measurement was performed in conformity with JIS K-6992-2 (2004). After compression molding a sheet having a thickness of 5.9 mm, a test piece having the shape and dimension of partition "nominal 50" shown in "Appendix 5 (provision) FIG. 1" in JIS K-6774 (2004), was manufactured, and the rupture time was measured by full notch creep test (FNCT) in pure water at 80° C. The tensile loads were 88N, 98N and 108N and the test points were 2 points per each load. The rupture time at stress 6 MPa was found from the plots of 6 points of the rupture time and stress in both logarithm scales by the method of least squares.

4. Evaluation Method of Hollow Molded Product (1) Moldability

In blow molding a fuel tank for an automobile, the drawing down property and the evenness in thickness of the parison were evaluated. The one which was good was graded "O", the one generated molding failure was graded "x", and the one which did not generate molding failure but the thickness distribution was relatively conspicuous was graded "Δ".

(2) Drop Impact Property

A tank for an automobile was filled up with an anti-freezing liquid and cooled to −40° C. The tank was vertically dropped from the concrete surface and drop impact property was evaluated by the presence of liquid leakage.

O: The liquid did not leak out when dropped from the height of 9 m.

Δ: The liquid did not leak out when dropped from the height of 6 m but the tank broke and the liquid leaked out when dropped from the height of 9 m.

x: The tank broke and the liquid leaked out when dropped from the height of 6 m.

(3) Internal Pressure Deformation Test

A plastic tank was subjected to internal pressure deformation test by internal pressure of 0.05 MPa at 60° C. After the elapse of 500 hours, the pressure was reduced and the temperature was lowered to room temperature. The one conspicuously deformed was graded "x", and the one not deformed so much was graded "O".

(4) Heat Resistance/Pressure Resistance Tests

A plastic tank was subjected to internal pressure and heat resistance test by internal pressure of 0.05 MPa at 60° C. After the elapse of 1,000 hours, the one which generated neither holes nor cracks was graded "O", and the one which was pierced with holes or generated cracks was graded "x".

Example 1-1

(1) Preparation of Chromium Catalyst Precursor

Silica gel was prepared in conformity with U.S. Pat. No. 5,232,883. The silica gel had a specific surface area of 800 m$^2$/g, pore volume of 2.0 cm$^3$/g, and an average particle size of 100 μm. Further, in conformity with the method of "EXAMPLES I. Catalyst Preparation Procedure" in U.S. Pat. No. 4,119,773, a dichloromethane solution containing chromium(III) acetate and aluminum sec-alkoxide was reacted with the above silica gel so that the contents of Cr and Al became 1% by weight and 2% by weight, respectively, to thereby obtain greenish white chromium catalyst precursor particles having good flowability.

(2) Calcining for Activation of Chromium Catalyst

The chromium catalyst precursor particles obtained in the above item (1) (5 kg) was put in a quartz glass tube having a diameter of 5 cm with a porous plate grating, set in a cylindrical electric oven for calcining, fluidized by air through a molecular sieve, and baked for activation at a linear velocity of 6 cm/s at 400° C. for 12 hours. The method of activation is shown in Table 6 below. Also, the objective contact temperature and the concentration of introduced oxygen are shown in FIG. 2 in time sequence. A yellow chromium catalyst showing to contain hexavalent chromium atoms was obtained.

(3) Polymerization

To a pipe loop type reactor having a capacity of 200 L, isobutane and the chromium catalyst obtained in the above item (2) were continuously supplied at a rate of 120 L/h and 5 g/h, respectively. While discharging the content of the reactor at a required velocity, ethylene and 1-hexene were supplied so as to maintain the mass ratio of 1-hexene concentration to ethylene concentration in the liquid phase at 0.10 at 100° C., and polymerization was performed continuously on the conditions of total pressure of 4.0 MPa and average residence time of 1.5 hours in the state of being impregnated with the liquid. The productivity of the catalyst was 3,000 g-polymer/g-catalyst, and the average polymerization activity was 2,000 g-polymer/g-catalyst/h.

(4) Formation of Fuel Tank for Automobile

A fuel tank for an automobile was obtained by using the following resins 1. to 4. so as to have the following layer structure with a co-extrusion blow molding apparatus (NB150, manufactured by Nippon Seiko Sho, Ltd.) on the following conditions.

(Resin Used)

1. Polyethylene-Based Resin

The ethylene-based polymer obtained in the above Example 1-6 (2) was used.

2. Adhesive Resin (MAPE)

Maleic anhydride-modified polyethylene grafted with 0.1% by weight of maleic anhydride (manufactured by Japan Polyethylene Corporation) was used.

3. Barriering Resin (EVOH)

Ethylene vinyl alcohol resin EVAL (manufactured by Kuraray Co., Ltd.) was used.

4. Regenerative Material

In the above layer structure, a fuel tank for an automobile was blow-molded by using the same resin with the resin for constituting the innermost layer as the resin for the regenerative material layer at the time of initiation of the experiment, and the reground resin obtained by grinding the above blow-molded fuel tank for an automobile was used as the regenerative material. Specifically, the fuel tank for an automobile having the following layer structure was molded and the regenerative material obtained by grinding the above molded fuel tank was used in the regenerative material layer.

(Layer Structure)

Outermost layer: polyethylene-based layer (layer structural ratio: 11%)

Regenerative material layer: polyethylene-based layer (layer structural ratio: 40%)

Adhesive outer layer: MAPE (layer structural ratio: 3%)

Barrier layer: EVOH (layer structural ratio: 3%)

Adhesive inner layer: MAPE (layer structural ratio: 3%)

Innermost layer: polyethylene-based layer (layer structural ratio: 40%)

(Molding Condition)

On the following co-extrusion multilayer condition, fuel tanks for automobile of multilayer structure of four kinds and six layers having a tank weight of 8 kg, and capacity of 60 L were molded at a molding temperature of 210° C., a cooling temperature of metal molds of 20° C., and cooling time of 180 seconds. As the shape of the tank, a saddle type was used. The layer structural ratio was regulated by adjusting the screw revolution speed of the extruder while observing the thickness ratio of the tank so that the outermost layer became 11%, the second layer 40%, the third layer 3%, the fourth layer 3%, the fifth layer 3%, and the sixth layer 40%.

Outermost layer (the first layer from the outside), diameter: 90 mmφ, L/D: 22

Second layer (the second layer from the outside), diameter: 120 mmφ, L/D: 28

Third layer (the third layer from the outside), diameter: 50 mmφ, L/D: 22

Fourth layer (the fourth layer from the outside), diameter: 50 mmφ, L/D: 28

Fifth layer (the fifth layer from the outside), diameter: 50 mmφ, L/D: 22

Innermost layer (the sixth layer from the outside), diameter: 120 mmφ, L/D: 241

The moldability of the fuel tank for automobile was evaluated. The results obtained are shown in Table 1 below.

Example 1-2

To a pipe loop type reactor having a capacity of 200 L, isobutane and the chromium catalyst obtained in Example 1-1 (2) were continuously supplied at a rate of 120 L/h and 5 g/h, respectively. While discharging the content of the reactor at a required velocity, ethylene and 1-hexene were supplied so as to maintain the mass ratio of 1-hexene concentration to ethylene concentration in the liquid phase at 0.13 at 98° C., and polymerization was performed continuously on the conditions of total pressure of 4.0 MPa and average residence time of 1.5 hours in the state of being impregnated with the liquid. The productivity of the catalyst was 3,000 g-polymer/g-catalyst, and the average polymerization activity was 2,000 g-polymer/g-catalyst/h. The moldability of the fuel tank for automobile was evaluated. The results obtained are shown in Table 1 below.

Comparative Example 1-1

(1) Calcining for Activation of Chromium Catalyst

The chromium catalyst precursor particles obtained in Example 1-1 (1) (5 kg) was put in a quartz glass tube having a diameter of 5 cm with a porous plate grating, set in a cylindrical electric oven for calcining, fluidized by air through a molecular sieve, and baked for activation at a linear velocity of 6 cm/s at 600° C. for 12 hours. A yellow chromium catalyst showing to contain hexavalent chromium atoms was obtained.

(2) Polymerization

To a pipe loop type reactor having a capacity of 200 L, isobutane and the chromium catalyst obtained in the above item (1) were continuously supplied at a rate of 120 L/h and 5 g/h, respectively. While discharging the content of the reactor at a required velocity, ethylene and 1-hexene were supplied so as to maintain the mass ratio of 1-hexene concentration to ethylene concentration in the liquid phase at 0.09 at 97° C., and polymerization was performed continuously on the conditions of total pressure of 4.0 MPa and average residence time of 1.3 hours in the state of being impregnated with the liquid. The productivity of the catalyst was 3,500 g-polymer/g-catalyst, and the average polymerization activity was 2,700 g-polymer/g-catalyst/h. The moldability of the fuel tank for automobile was evaluated. The results obtained are shown in Table 1 below. It can be seen that Comparative Example 1-1 is inferior to Examples 1-1 and 1-2 in FNCT and heat resistance/pressure resistance.

Comparative Example 1-2

A fuel tank for an automobile was molded in the same manner as in Example 1-1 (4) with a polymer obtained by polymerization according to the method disclosed in WO 2010/150410, Example 1-21 as the polyethylene, and the fuel tank for an automobile was evaluated. The moldability of the fuel tank for automobile was evaluated. The results obtained are shown in Table 1 below. It can be seen that Comparative Example 1-2 is inferior to the Example in swell ratio and moldability.

Comparative Example 1-3

A fuel tank for an automobile was molded in the same manner as in Example 1-1 (4) with a polymer obtained by polymerization according to the method disclosed in WO 2010/150410, Example 1-22 as the polyethylene, and the fuel tank for an automobile was evaluated. The moldability of the fuel tank for automobile was evaluated. The results obtained are shown in Table 1 below. It can be seen that Comparative Example 1-3 is inferior to the Example in impact resistance.

Comparative Example 1-4

A fuel tank for an automobile was molded in the same manner as in Example 1-1 (4) except for using high density polyethylene "HB111R" (manufactured by Japan Polyethylene Corporation) as the polyethylene, and the fuel tank for an automobile was evaluated. The physical properties of the polyethylene and the result of evaluation of the fuel tank for automobile are shown in Table 1 below. It can be seen that obtained polyethylene is inferior to the Example in stiffness and pressure deformation.

Comparative Example 1-5

A fuel tank for an automobile was molded in the same manner as in Example 1-1 (4) except for using high density polyethylene "4261AG" (manufactured by Basell) as the polyethylene, and the fuel tank for an automobile was evaluated. The physical properties of the polyethylene and the result of evaluation of the fuel tank for automobile are shown in Table 1 below. It can be seen that obtained polyethylene is inferior to the Example in stiffness and pressure deformation.

TABLE 1

| | Physical Properties of Polymer | | | | | | | | | | Physical Properties of Molded Product | | | |
|---|---|---|---|---|---|---|---|---|---|---|---|---|---|---|
| | HLMFR (g/10 min) | Density (g/cm$^3$) | Mn (×10$^4$) | Mw (×10$^4$) | Mw/Mn | λmax | SR (%) | Modulus of Elasticity in Flexure (MPa) | Charpy Impact (kJ/m$^2$) | Tensile Impact (kJ/m$^2$) | FNCT (hr) | Moldability | Drop Impact | Internal Pressure Deformation Test | Heat Resistance/Pressure Resistance Test |
| Example 1-1 | 4.6 | 0.9490 | 1.5 | 39.1 | 26.2 | 1.1 | 55 | 1,190 | 10 | 140 | 50 | ○ | ○ | ○ | ○ |
| Example 1-2 | 4.4 | 0.9471 | 1.4 | 40.1 | 28.6 | 1.1 | 56 | 1,050 | 9 | 140 | 150 | ○ | ○ | ○ | ○ |
| Comparative Example 1-1 | 4.8 | 0.9490 | 1.5 | 34.2 | 22.8 | 1.1 | 55 | 1,250 | 9 | 140 | <10 | ○ | ○ | ○ | X |

TABLE 1-continued

| | Physical Properties of Polymer | | | | | | | | | | Physical Properties of Molded Product | | | |
|---|---|---|---|---|---|---|---|---|---|---|---|---|---|---|
| | HLMFR (g/10 min) | Density (g/cm³) | Mn (×10⁴) | Mw (×10⁴) | Mw/Mn | λmax | SR (%) | Modulus of Elasticity in Flexure (MPa) | Charpy Impact (kJ/m²) | Tensile Impact (kJ/m²) | FNCT (hr) | Moldability | Drop Impact | Internal Pressure Deformation Test | Heat Resistance/Pressure Resistance Test |
| Comparative Example 1-2 | 4.5 | 0.9469 | 1.6 | 39.0 | 24.4 | 1.2 | 45 | 1,050 | 14 | 130 | 56 | Δ | ○ | ○ | ○ |
| Comparative Example 1-3 | 5.7 | 0.9490 | 1.0 | 34.5 | 34.5 | 1.1 | 60 | 1,210 | 8 | 120 | 160 | ○ | Δ | ○ | ○ |
| Comparative Example 1-4 | 5.8 | 0.9445 | 1.9 | 33.0 | 20.0 | 1.2 | 60 | 900 | 10 | 145 | 65 | ○ | ○ | X | ○ |
| Comparative Example 1-5 | 5.4 | 0.9450 | 1.5 | 31.9 | 21.0 | 1.1 | 55 | 900 | 10 | 145 | 87 | ○ | ○ | X | ○ |

Example 2-1

(1) Preparation of Chromium Catalyst Precursor

Support A (silica gel, specific surface area: 850 m²/g, pore volume: 2.2 cm³/g, average particle size: 100 μm) (50 g) prepared in conformity with U.S. Pat. No. 5,232,883, and 200 mL of ion exchange water were put into a 1 L flask with a stirrer, and heated in an oil bath at 50° C. with stirring at revolution speed of 50 rpm. All the amount of an aqueous solution separately prepared by dissolving 2.2 g of chromium(III) acetate (manufactured by Wako Pure Chemical Industries) in 70 mL of ion exchange water was added to the above reaction mixture, revolution speed was raised to 150 rpm, and stirring was continued for 4 hours, thereby the silica gel was thoroughly impregnated with the chromium compound. Subsequently, the temperature of the oil bath was raised to 155° C. and water was completely distilled off, and the reaction product was further dried at 120° C. overnight to thereby obtain greenish white chromium catalyst precursor particles having good flowability.

(2) Calcining for Activation of Chromium Catalyst

The chromium catalyst precursor particles obtained in the above item (1) (15 g) was put in a quartz glass tube having a diameter of 5 cm with a porous plate grating, set in a cylindrical electric oven for calcining, fluidized by air through a molecular sieve, and baked for activation at a linear velocity of 6 cm/s at 450° C. for 12 hours. A yellow chromium catalyst showing to contain hexavalent chromium atoms was obtained.

(3) Polymerization

Into a sufficiently nitrogen-substituted 2.0 L autoclave were put 100 mg of the chromium catalyst obtained in the above (2) and 0.8 L of isobutane, and the inner temperature was raised to 100° C. 1-Hexene (5.0 g) was pressure introduced by ethylene, and polymerization was performed so that the catalyst productivity became 3,000 g-polymer/g-catalyst with maintaining the ethylene partial pressure at 1.0 MPa. Subsequently, the content gas was discharged out of the system to thereby terminate the polymerization. The result of polymerization, HLMFR of the polymerized polymer, and the result of measurement of density are shown in Table 2 below. The time from ethylene introduction to polymerization initiation, when ethylene is not consumed, was designated as induction time. The time from termination of induction time to termination of polymerization was designated as polymerization time.

Example 2-2

(1) Preparation of Chromium Catalyst Precursor

Support B (silica gel) was prepared in conformity with U.S. Pat. No. 5,232,883. Support B had a specific surface area of 850 m²/g, a pore volume of 2.0 cm³/g, and an average particle size of 100 μm.

Further, in conformity with the method of "EXAMPLES I. Catalyst Preparation Procedure" in U.S. Pat. No. 4,119,773, a dichloromethane solution containing chromium(III) acetate and aluminum sec-alkoxide was reacted with the above silica gel so that the contents of Cr and Al became 1% by weight and 1% by weight, respectively, to thereby obtain greenish white chromium catalyst precursor particles having good flowability.

(2) Calcining for Activation of Chromium Catalyst, Polymerization

Calcining for activation of the chromium catalyst and polymerization were performed in the same manner as in Example 2-1 (2) and (3). The result of polymerization, HLMFR of the polymerized polymer, and the result of measurement of density are shown in Table 2 below.

Example 2-3

(1) Preparation of Chromium Catalyst Precursor

Support C (silica gel) was prepared in conformity with U.S. Pat. No. 5,232,883. Support C had a specific surface area of 800 m²/g, a pore volume of 2.0 cm³/g, and an average particle size of 100 μm.

Further, in conformity with the method of "EXAMPLES I. Catalyst Preparation Procedure" in U.S. Pat. No. 4,119,773, a dichloromethane solution containing chromium(III) acetate and aluminum sec-alkoxide was reacted with the above silica gel so that the contents of Cr and Al became 1% by weight and 2% by weight, respectively, to thereby obtain greenish white chromium catalyst precursor particles having good flowability.

(2) Calcining for Activation of Chromium Catalyst, Polymerization

Calcining for activation of the chromium catalyst was performed in the same manner as in Example 2-1 (2) except for changing the activation temperature from 450° C. to 500° C. Polymerization was performed in the same manner as in Example 2-1 (3). The result of polymerization, HLMFR of the polymerized polymer, and the result of measurement of density are shown in Table 2 below.

Example 2-4

Polymerization was performed by using the chromium catalyst used in Example 2-3 having been subjected to calcining for activation.

Into a sufficiently nitrogen-substituted 2.0 L autoclave were put 100 mg of the chromium catalyst and 0.8 L of isobutane, and the inner temperature was raised to 102° C. 1-Hexene (4.0 g) was pressure introduced by ethylene, and polymerization was performed so that the catalyst productivity became 3,000 g-polymer/g-catalyst with maintaining the ethylene partial pressure at 1.0 MPa. Subsequently, the content gas was discharged out of the system to thereby terminate the polymerization. The result of polymerization, HLMFR of the polymerized polymer, and the result of measurement of density are shown in Table 2 below.

Example 2-5

(1) Preparation of Chromium Catalyst Precursor, Calcining for Activation of Chromium Catalyst Calcining for activation was performed in the same manner as in Example 2-3 except that activation of the chromium-supported catalyst before activation used in Example 2-3 was activated at 450° C. not 500° C., and a yellow chromium catalyst was obtained.

(2) Polymerization

Polymerization was performed in the same manner as in Example 2-1 (3). The result of polymerization, HLMFR of the polymerized polymer, and the result of measurement of density are shown in Table 2 below.

Example 2-6

Polymerization was performed by using the chromium catalyst manufactured in Example 2-5.

Polymerization was performed in the same manner as in Example 2-1 (3) except for changing the amount of 1-hexene to 7.0 g and the polymerization temperature to 98° C. The result of polymerization, HLMFR of the polymerized polymer, and the result of measurement of density are shown in Table 2 below.

Example 2-7

Polymerization was performed by using the chromium catalyst manufactured in Example 2-5.

Polymerization was performed in the same manner as in Example 2-1 (3) except for changing the amount of 1-hexene to 6.0 g and the polymerization temperature to 99° C. The result of polymerization, HLMFR of the polymerized polymer, and the result of measurement of density are shown in Table 2 below.

Example 2-8

Polymerization was performed by using the chromium catalyst manufactured in Example 2-5.

Polymerization was performed in the same manner as in Example 2-1 (3) except for changing the amount of 1-hexene to 6.0 g and the polymerization temperature to 98° C. The result of polymerization, HLMFR of the polymerized polymer, and the result of measurement of density are shown in Table 2 below.

Example 2-9

(1) Preparation of Chromium Catalyst Precursor, Calcining for Activation of Chromium Catalyst Calcining for activation was performed in the same manner as in Example 2-3 except that activation of the chromium-supported catalyst before activation used in Example 2-3 was activated at 400° C. not 500° C., and a yellow chromium catalyst was obtained.

(2) Polymerization

Into a sufficiently nitrogen-substituted 2.0 L autoclave were put 100 mg of the chromium catalyst obtained in the above (1) and 0.8 L of isobutane, and the inner temperature was raised to 100° C. 1-Hexene (7.0 g) was pressure introduced by ethylene, and polymerization was performed so that the catalyst productivity became 3,000 g-polymer/g-catalyst with maintaining the ethylene partial pressure at 1.4 MPa. Subsequently, the content gas was discharged out of the system to thereby terminate the polymerization. The result of polymerization, HLMFR of the polymerized polymer, and the result of measurement of density are shown in Table 2 below.

Example 2-10

Polymerization was performed by using the chromium catalyst manufactured in Example 2-9.

Polymerization was performed in the same manner as in Example 2-9 (2) except for changing the amount of 1-hexene to 10.0 g and the polymerization temperature to 98° C. The result of polymerization, HLMFR of the polymerized polymer, and the result of measurement of density are shown in Table 2 below.

Example 2-11

Polymerization was performed by using the chromium catalyst manufactured in Example 2-9.

Polymerization was performed in the same manner as in Example 2-9 (2) except for changing the amount of 1-hexene to 9.0 g. The result of polymerization, HLMFR of the polymerized polymer, and the result of measurement of density are shown in Table 2 below.

Example 2-12

Polymerization was performed by using the chromium catalyst manufactured in Example 2-9.

Polymerization was performed in the same manner as in Example 2-9 (2) except for changing the amount of 1-hexene to 8.0 g and the polymerization temperature to 98° C. The result of polymerization, HLMFR of the polymerized polymer, and the result of measurement of density are shown in Table 2 below.

Comparative Example 2-1

(1) Preparation of Chromium Catalyst Precursor

Support D (silica gel) having a specific surface area of 420 m²/g, a pore volume of 1.7 cm³/g, and an average particle size of 80 μm (50 g) and 200 mL of ion exchange water were put into a 1 L flask with a stirrer, and heated in an oil bath at 50° C. with stirring at revolution speed of 50 rpm. All the amount of an aqueous solution separately prepared by dissolving 2.2 g of chromium(III) acetate (manufactured by Wako Pure Chemical Industries) in 70 mL of ion exchange water was added to the above reaction mixture, revolution speed was raised to 150 rpm, and stirring was continued for 4 hours, thereby the silica gel was thoroughly impregnated with the chromium compound. Subsequently, the temperature of the oil bath was raised to 155° C. and water was completely distilled off, and the reaction product was further dried at 120° C. overnight to thereby obtain greenish white chromium catalyst precursor particles having good flowability.

(2) Calcining for Activation of Chromium Catalyst

The chromium catalyst precursor particles obtained in the above item (1) (15 g) was put in a quartz glass tube having a diameter of 5 cm with a porous plate grating, set in a cylindrical electric oven for calcining, fluidized by air through a molecular sieve, and baked for activation at a linear velocity of 6 cm/s at 600° C. for 12 hours. A yellow chromium catalyst showing to contain hexavalent chromium atoms was obtained.

(3) Polymerization

Into a sufficiently nitrogen-substituted 2.0 L autoclave were put 100 mg of the chromium catalyst obtained in the above (2) and 0.8 L of isobutane, and the inner temperature was raised to 100° C. 1-Hexene (3.0 g) was pressure introduced by ethylene, and polymerization was performed so that the catalyst productivity became 3,000 g-polymer/g-catalyst with maintaining the ethylene partial pressure at 1.4 MPa. Subsequently, the content gas was discharged out of the system to thereby terminate the polymerization. The result of polymerization, HLMFR of the polymerized polymer, and the result of measurement of density are shown in Table 2 below.

Comparative Example 2-2

Polymerization was performed by using the chromium catalyst manufactured in Comparative Example 2-1.

Polymerization was performed in the same manner as in Comparative Example 2-1 (3) except for changing the amount of 1-hexene to 4.0 g and the polymerization temperature to 98° C. The result of polymerization, HLMFR of the polymerized polymer, and the result of measurement of density are shown in Table 2 below.

Comparative Example 2-3

(1) Preparation of Chromium Catalyst Precursor, Calcining for Activation of Chromium Catalyst Calcining for activation was performed in the same manner as in Comparative Example 2-1 except that activation of the chromium-supported catalyst before activation used in Comparative Example 2-1 was activated at 600° C. not 500° C., and a yellow chromium catalyst was obtained.

(2) Polymerization

Into a sufficiently nitrogen-substituted 2.0 L autoclave were put 100 mg of the chromium catalyst obtained in the above (1) and 0.8 L of isobutane, and the inner temperature was raised to 102° C. 1-Hexene (4.0 g) was pressure introduced by ethylene, and polymerization was performed so that the catalyst productivity became 3,000 g-polymer/g-catalyst with maintaining the ethylene partial pressure at 1.4 MPa. Subsequently, the content gas was discharged out of the system to thereby terminate the polymerization. The result of polymerization, HLMFR of the polymerized polymer, and the result of measurement of density are shown in Table 2 below.

Comparative Example 2-4

Polymerization was performed by using the chromium catalyst manufactured in Comparative Example 2-3.

Polymerization was performed in the same manner as in Comparative Example 2-9 (2) except for changing the amount of 1-hexene to 5.0 g and the polymerization temperature to 101° C. The result of polymerization, HLMFR of the polymerized polymer, and the result of measurement of density are shown in Table 2 below.

Comparative Example 2-5

(1) Preparation of Chromium Catalyst Precursor, Calcining for Activation of Chromium Catalyst Calcining for activation was performed in the same manner as in Comparative Example 2-1 except that activation of the chromium-supported catalyst before activation used in Comparative Example 2-1 was activated at 400° C. not 600° C., and a yellow chromium catalyst was obtained.

(2) Polymerization

Into a sufficiently nitrogen-substituted 2.0 L autoclave were put 100 mg of the chromium catalyst obtained in the above (1) and 0.8 L of isobutane, and the inner temperature was raised to 100° C. 1-Hexene (5.0 g) was pressure introduced by ethylene, and polymerization was performed so that the catalyst productivity became 3,000 g-polymer/g-catalyst with maintaining the ethylene partial pressure at 1.4 MPa. However, ethylene polymerization was hardly obtained. The content gas was discharged out of the system to thereby terminate the polymerization. The result of polymerization is shown in Table 2 below.

Comparative Example 2-6

(1) Preparation of Chromium Catalyst Precursor

Support E (silica gel) having a specific surface area of 500 m$^2$/g, a pore volume of 1.5 cm$^2$/g, and an average particle size of 70 μm (50 g) and 200 mL of ion exchange water were put into a 1 L flask with a stirrer, and heated in an oil bath at 50° C. with stirring at revolution speed of 50 rpm. All the amount of an aqueous solution separately prepared by dissolving 2.2 g of chromium(III) acetate (manufactured by Wako Pure Chemical Industries) in 70 mL of ion exchange water was added to the above reaction mixture, revolution speed was raised to 150 rpm, and stirring was continued for 4 hours, thereby the silica gel was thoroughly impregnated with the chromium compound. Subsequently, the temperature of the oil bath was raised to 155° C. and water was completely distilled off, and the reaction product was further dried at 120° C. overnight to thereby obtain greenish white chromium catalyst precursor particles having good flowability.

(2) Calcining for Activation of Chromium Catalyst

The chromium catalyst precursor particles obtained in the above item (1) (15 g) was put in a quartz glass tube having a diameter of 5 cm with a porous plate grating, set in a cylindrical electric oven for calcining, fluidized by air through a molecular sieve, and baked for activation at a linear velocity of 6 cm/s at 600° C. for 12 hours. A yellow chromium catalyst showing to contain hexavalent chromium atoms was obtained.

(3) Polymerization

Into a sufficiently nitrogen-substituted 2.0 L autoclave were put 100 mg of the chromium catalyst obtained in the above (2) and 0.8 L of isobutane, and the inner temperature was raised to 101° C. 1-Hexene (3.0 g) was pressure introduced by ethylene, and polymerization was performed so that the catalyst productivity became 3,000 g-polymer/g-catalyst with maintaining the ethylene partial pressure at 1.4 MPa. Subsequently, the content gas was discharged out of the system to thereby terminate the polymerization. The result of polymerization, HLMFR of the polymerized polymer, and the result of measurement of density are shown in Table 2 below.

Comparative Example 2-7

Polymerization was performed by using the chromium catalyst manufactured in Comparative Example 2-6.

Polymerization was performed in the same manner as in Comparative Example 2-6 (3) except for changing the amount of 1-hexene to 5.0 g and the polymerization temperature to 100° C. The result of polymerization, HLMFR of the polymerized polymer, and the result of measurement of density are shown in Table 2 below.

Comparative Example 2-8

Polymerization was performed by using the chromium catalyst manufactured in Comparative Example 2-6.

Polymerization was performed in the same manner as in Comparative Example 2-6 (3) except for changing the amount of 1-hexene to 5.0 g and the polymerization temperature to 99° C. The result of polymerization, HLMFR of the polymerized polymer, and the result of measurement of density are shown in Table 2 below.

Comparative Example 2-9

(1) Preparation of Chromium Catalyst Precursor, Calcining for Activation of Chromium Catalyst Calcining for activation was performed in the same manner as in Comparative Example 2-6 except that activation of the chromium-supported catalyst before activation used in Comparative Example 2-6 was activated at 500° C. not 600° C., and a yellow chromium catalyst was obtained.
(2) Polymerization Into a sufficiently nitrogen-substituted 2.0 L autoclave were put 100 mg of the chromium catalyst obtained in the above (1) and 0.8 L of isobutane, and the inner temperature was raised to 103° C. 1-Hexene (3.0 g) was pressure introduced by ethylene, and polymerization was performed so that the catalyst productivity became 3,000 g-polymer/g-catalyst with maintaining the ethylene partial pressure at 1.4 MPa. Subsequently, the content gas was discharged out of the system to thereby terminate the polymerization. The result of polymerization, HLMFR of the polymerized polymer, and the result of measurement of density are shown in Table 2 below.

Comparative Example 2-10

(1) Preparation of Chromium Catalyst Precursor, Calcining for Activation of Chromium Catalyst Calcining for activation was performed in the same manner as in Comparative Example 2-6 except that activation of the chromium-supported catalyst before activation used in Comparative Example 2-6 was activated at 450° C. not 600° C., and a yellow chromium catalyst was obtained.
(2) Polymerization Into a sufficiently nitrogen-substituted 2.0 L autoclave were put 100 mg of the chromium catalyst obtained in the above (1) and 0.8 L of isobutane, and the inner temperature was raised to 103° C. 1-Hexene (3.0 g) was pressure introduced by ethylene, and polymerization was performed so that the catalyst productivity became 3,000 g-polymer/g-catalyst with maintaining the ethylene partial pressure at 1.4 MPa. Subsequently, the content gas was discharged out of the system to thereby terminate the polymerization. The result of polymerization, HLMFR of the polymerized polymer, and the result of measurement of density are shown in Table 2 below.

Comparative Example 2-11

(1) Preparation of Chromium Catalyst Precursor, Calcining for Activation of Chromium Catalyst Calcining for activation was performed in the same manner as in Comparative Example 2-6 except that activation of the chromium-supported catalyst before activation used in Comparative Example 2-6 was activated at 400° C. not 600° C., and a yellow chromium catalyst was obtained.
(2) Polymerization Into a sufficiently nitrogen-substituted 2.0 L autoclave were put 100 mg of the chromium catalyst obtained in the above (1) and 0.8 L of isobutane, and the inner temperature was raised to 103° C. 1-Hexene (3.0 g) was pressure introduced by ethylene, and the ethylene partial pressure was maintained at 1.4 MPa for 60 minutes, but ethylene polymer was hardly obtained. The content gas was discharged out of the system to thereby terminate the polymerization. The result of polymerization is shown in Table 2 below.

Comparative Example 2-12

(1) Preparation of Chromium Catalyst Precursor, Calcining for Activation of Chromium Catalyst Calcining for activation was performed in the same manner as in Example 2-3 except that activation of the chromium-supported catalyst before activation used in Example 2-3 was activated at 600° C. not 500° C., and a yellow chromium catalyst was obtained.
(2) Polymerization Into a sufficiently nitrogen-substituted 2.0 L autoclave were put 100 mg of the chromium catalyst obtained in the above (1) and 0.8 L of isobutane, and the inner temperature was raised to 98° C. 1-Hexene (3.5 g) was pressure introduced by ethylene, and polymerization was performed so that the catalyst productivity became 3,000 g-polymer/g-catalyst with maintaining the ethylene partial pressure at 1.0 MPa. Subsequently, the content gas was discharged out of the system to thereby terminate the polymerization. The result of polymerization, HLMFR of the polymerized polymer, and the result of measurement of density are shown in Table 2 below.

Comparative Example 2-13

(1) Preparation of Chromium Catalyst Precursor, Calcining for Activation of Chromium Catalyst Calcining for activation was performed in the same manner as in Example 2-3 except that activation of the chromium-supported catalyst before activation used in Example 2-3 was activated at 200° C. not 500° C., and a yellow chromium catalyst was obtained.
(2) Polymerization Into a sufficiently nitrogen-substituted 2.0 L autoclave were put 100 mg of the chromium catalyst obtained in the above (1) and 0.8 L of isobutane, and the inner temperature was raised to 100° C. 1-Hexene (10.0 g) was pressure introduced by ethylene, and the ethylene partial pressure was maintained at 1.4 MPa for 60 minutes. However, ethylene polymer was hardly obtained. The content gas was discharged out of the system to thereby terminate the polymerization. The result of polymerization is shown in Table 2 below.

TABLE 2

|  | Catalyst Precursor | | | Activation | | Polymerization Ethylene | | |
|---|---|---|---|---|---|---|---|---|
|  | Support No. | Cr Content (wt %) | Al Content (wt %) | Activation Temperature (° C.) | Activation Time (hr) | Partial Pressure (MPa) | Polymerization Temperature (° C.) | Amount of 1-Hexene (g) |
| Example 2-1 | Support A | 1 | 0 | 450 | 12 | 1.0 | 100 | 5.0 |
| Example 2-2 | Support B | 1 | 1 | 450 | 12 | 1.0 | 100 | 5.0 |
| Example 2-3 | Support C | 1 | 2 | 500 | 12 | 1.0 | 100 | 5.0 |
| Example 2-4 | Support C | 1 | 2 | 500 | 12 | 1.0 | 102 | 4.0 |
| Example 2-5 | Support C | 1 | 2 | 450 | 12 | 1.0 | 100 | 5.0 |
| Example 2-6 | Support C | 1 | 2 | 450 | 12 | 1.0 | 98 | 7.0 |
| Example 2-7 | Support C | 1 | 2 | 450 | 12 | 1.0 | 99 | 6.0 |
| Example 2-8 | Support C | 1 | 2 | 450 | 12 | 1.0 | 98 | 6.0 |
| Example 2-9 | Support C | 1 | 2 | 400 | 12 | 1.4 | 100 | 7.0 |
| Example 2-10 | Support C | 1 | 2 | 400 | 12 | 1.4 | 98 | 10.0 |
| Example 2-11 | Support C | 1 | 2 | 400 | 12 | 1.4 | 100 | 9.0 |
| Example 2-12 | Support C | 1 | 2 | 400 | 12 | 1.4 | 98 | 8.0 |
| Comparative Example 2-1 | Support D | 1 | 0 | 600 | 12 | 1.4 | 100 | 3.0 |
| Comparative Example 2-2 | Support D | 1 | 0 | 600 | 12 | 1.4 | 98 | 4.0 |
| Comparative Example 2-3 | Support D | 1 | 0 | 500 | 12 | 1.4 | 102 | 4.0 |
| Comparative Example 2-4 | Support D | 1 | 0 | 500 | 12 | 1.4 | 101 | 5.0 |
| Comparative Example 2-5 | Support D | 1 | 0 | 400 | 12 | 1.4 | 100 | 5.0 |
| Comparative Example 2-6 | Support D | 1 | 0 | 600 | 12 | 1.4 | 101 | 3.0 |
| Comparative Example 2-7 | Support D | 1 | 0 | 600 | 12 | 1.4 | 100 | 5.0 |
| Comparative Example 2-8 | Support D | 1 | 0 | 600 | 12 | 1.4 | 99 | 5.0 |
| Comparative Example 2-9 | Support D | 1 | 0 | 500 | 12 | 1.4 | 103 | 3.0 |
| Comparative Example 2-10 | Support D | 1 | 0 | 450 | 12 | 1.4 | 103 | 3.0 |
| Comparative Example 2-11 | Support D | 1 | 0 | 400 | 12 | 1.4 | 103 | 3.0 |
| Comparative Example 2-12 | Support C | 1 | 2 | 600 | 12 | 1.0 | 98 | 3.5 |
| Comparative Example 2-13 | Support C | 1 | 2 | 200 | 12 | 1.4 | 100 | 10.0 |

|  | Polymerization | | | | Physical Properties of Polymer | | | |
|---|---|---|---|---|---|---|---|---|
|  | Induction Time (min) | Polymerization Time (min) | Productivity (g/g) | Activity (g/g/h/MPa) | HLMFR (g/10 min) | Density (g/cm³) | FNCT (hr) | Charpy (kJ/m²) |
| Example 2-1 | 26 | 91 | 3,000 | 2,000 | 2.2 | 0.9448 | — | — |
| Example 2-2 | 16 | 88 | 3,000 | 2,000 | 4.5 | 0.9476 | 73 | 8 |
| Example 2-3 | 13 | 64 | 3,000 | 2,800 | 5.4 | 0.9469 | 31 | 8 |
| Example 2-4 | 8 | 57 | 3,000 | 3,200 | 6.0 | 0.9483 | 27 | 9 |
| Example 2-5 | 14 | 77 | 3,000 | 2,300 | 5.8 | 0.9487 | 38 | 8 |
| Example 2-6 | 14 | 77 | 3,000 | 2,300 | 5.9 | 0.9461 | 149 | 8 |
| Example 2-7 | 7 | 77 | 3,000 | 2,300 | 5.9 | 0.9473 | 64 | 7 |
| Example 2-8 | 8 | 73 | 3,000 | 2,500 | 5.5 | 0.9469 | 74 | 7 |
| Example 2-9 | 6 | 95 | 3,000 | 1,400 | 4.5 | 0.9502 | 43 | 7 |
| Example 2-10 | 7 | 96 | 3,000 | 1,300 | 6.7 | 0.9476 | 222 | 7 |
| Example 2-11 | 5 | 91 | 3,000 | 1,400 | 6.8 | 0.9478 | 108 | 7 |
| Example 2-12 | 8 | 88 | 3,000 | 1,500 | 6.0 | 0.9495 | 98 | 7 |
| Comparative Example 2-1 | 18 | 62 | 3,000 | 2,100 | 6.2 | 0.9476 | <15 | 8 |
| Comparative Example 2-2 | 25 | 76 | 3,000 | 1,700 | 4.4 | 0.9468 | 18 | 8 |
| Comparative Example 2-3 | 26 | 108 | 3,000 | 1,200 | 4.5 | 0.9475 | 40 | 7 |
| Comparative Example 2-4 | 30 | 107 | 3,000 | 1,200 | 4.3 | 0.9464 | 45 | 7 |
| Comparative Example 2-5 | — | 60 | 100 | 100 | — | — | — | — |
| Comparative Example 2-6 | 24 | 51 | 3,000 | 2,500 | 4.8 | 0.9478 | <15 | 8 |
| Comparative Example 2-7 | 42 | 82 | 3,000 | 1,700 | 5.0 | 0.9449 | 19 | 8 |
| Comparative Example 2-8 | 30 | 71 | 3,000 | 1,800 | 4.1 | 0.9455 | 20 | 8 |
| Comparative Example 2-9 | 25 | 114 | 3,000 | 1,100 | 2.7 | 0.9481 | <15 | 8 |
| Comparative Example 2-10 | 38 | 212 | 3,000 | 600 | 2.2 | 0.9471 | 52 | 7 |
| Comparative Example 2-11 | — | 60 | 100 | 100 | — | — | — | — |
| Comparative Example 2-12 | 5 | 50 | 3,000 | 3,600 | 5.5 | 0.9470 | <15 | 8 |
| Comparative Example 2-13 | 0 | 60 | 0 | 0 | — | — | — | — |

Support A, surface area: 850 m²/g, pore volume: 2.2 cm³/g, average particle size: 100 μm
Support B, surface area: 850 m²/g, pore volume: 2.0 cm³/g, average particle size: 100 μm
Support C, surface area: 800 m²/g, pore volume: 2.0 cm³/g, average particle size: 100 μm
Support D, surface area: 420 m²/g, pore volume: 1.7 cm³/g, average particle size: 80 μm
Support E, surface area: 500 m²/g, pore volume: 1.5 cm³/g, average particle size: 70 μm In Examples 2-1 to 2-12 satisfying the requisites of the invention, all of the manufactured chromium catalysts showed excellent polymerization activity, although they are chromium catalysts activated by low activation temperature, such as 400° C. to 500° C. as compared with conventional catalysts. Particularly, the catalysts in Examples 2-9 to 2-12 showed that they have still activity by activation at 400° C., as a result, the obtained ethylene polymers exhibit especially excellent durability, and so very useful.

On the other hand, from the results in Comparative Examples 2-1, 2-2, 2-6, 2-7, 2-8 and 2-12, it is understood that the temperature for activating the catalysts is high, and so the obtained polymers are inferior in the balance of density (stiffness) and FNCT. It is also seen from the results of Comparative Examples of 2-3, 2-4, 2-5, 2-9, 2-10 and 2-11 that when the surface area of the catalyst supports is small, activity truly lowers when the temperature comes to 500° C. or less. In particular, the difference in the effects is clearly seen when Comparative Examples 2-5 and 2-11, which show no activity at all by activation at 400° C., and Examples 2-9 to 2-12 are compared.

From the above facts, it can be understood that polymerization activity, in particular, the polymerization activity obtained by activation at a low temperature by the catalyst for ethylene polymerization for use in the manufacturing method of the invention, is excellent as compared with conventional catalysts, and ethylene-based polymers having extremely excellent balance of durability, impact resistance and moldability can be manufactured by using the catalysts for ethylene polymerization according to the invention.

air through a molecular sieve, and baked for activation at a linear velocity of 6 cm/s at 600° C. for 12 hours. A yellow chromium catalyst showing to contain hexavalent chromium atoms was obtained.

(2) Polymerization

To a pipe loop type reactor having a capacity of 200 L, isobutane and the chromium catalyst obtained in the above (1) were continuously supplied at a rate of 120 L/h and 5 g/h, respectively. While discharging the content of the reactor at a required velocity, ethylene and 1-hexene were supplied so as to maintain the mass ratio of 1-hexene concentration to ethylene concentration in the liquid phase at 0.09 at 97° C., and polymerization was performed continuously on the conditions of total pressure of 4.0 MPa and average residence time of 1.3 hours in the state of being impregnated with the liquid. The productivity of the catalyst was 3,500 g-polymer/g-catalyst, and the average polymerization activity was 2,700 g-polymer/g-catalyst/h. HLMFR of the polymerized polymer and the result of measurement of density are shown in Table 3 below. It is seen that the result of FNCT is inferior, although the density is the same.

TABLE 3

| | Catalyst Precursor | | | Activation | | Physical Properties of Polymer | | | |
|---|---|---|---|---|---|---|---|---|---|
| | Support No. | Cr Content (wt %) | Al Content (wt %) | Activation Temperature (° C.) | Activation Time (hr) | HLMFR (g/10 min) | Density (g/cm$^3$) | FNCT (hr) | Charpy Impact (kJ/m$^2$) |
| Example 2-13 | Support C | 1 | 2 | 400 | 12 | 4.6 | 0.9490 | 50 | 10 |
| Comparative Example 2-14 | Support C | 1 | 2 | 600 | 12 | 4.8 | 0.9490 | <10 | 9 |

Support C, surface area: 800 m$^2$/g, pore volume: 2.0 cm$^3$/g, average particle size: 100 μm Example 2-13

(1) Calcining for Activation of Chromium Catalyst

The chromium catalyst precursor particles obtained by the method in Example 2-3 (1) (5 kg) was put in a quartz glass tube having a diameter of 5 cm with a porous plate grating, set in a cylindrical electric oven for calcining, fluidized by air through a molecular sieve, and baked for activation at a linear velocity of 6 cm/s at 400° C. for 12 hours. A yellow chromium catalyst showing to contain hexavalent chromium atoms was obtained.

(2) Polymerization

To a pipe loop type reactor having a capacity of 200 L, isobutane and the chromium catalyst obtained in the above (1) were continuously supplied at a rate of 120 L/h and 5 g/h, respectively. While discharging the content of the reactor at a required velocity, ethylene and 1-hexene were supplied so as to maintain the mass ratio of 1-hexene concentration to ethylene concentration in the liquid phase at 0.10 at 100° C., and polymerization was performed continuously on the conditions of total pressure of 4.0 MPa and average residence time of 1.5 hours in the state of being impregnated with the liquid. The productivity of the catalyst was 3,000 g-polymer/g-catalyst, and the average polymerization activity was 2,000 g-polymer/g-catalyst/h. HLMFR of the polymerized polymer and the result of measurement of density are shown in Table 3 below.

Comparative Example 2-14

(1) Calcining for Activation of Chromium Catalyst

The chromium catalyst precursor particles obtained by the method in Example 2-3 (1) (5 kg) was put in a quartz glass tube having a diameter of 5 cm with a porous plate grating, set in a cylindrical electric oven for calcining, fluidized by In Example 2-13 satisfying the requisites of the invention, the manufactured chromium catalyst showed excellent polymerization activity, although it is the chromium catalyst activated by low activation temperature such as 400° C. as compared with conventional catalysts. As a result, the obtained ethylene polymer exhibits especially excellent durability, and so very useful.

On the other hand, in Comparative Example 2-14, activation temperature is 600° C., which is higher than in Example 2-13, but the durability of the obtained polymer is smaller, thus, the difference in the effects is clearly seen.

From the above facts, it can be understood that polymerization activity, in particular, the polymerization activity obtained by activation at a low temperature by the catalyst for ethylene polymerization for use in the manufacturing method of the invention, is excellent as compared with conventional catalysts, and ethylene-based polymers having extremely excellent balance of durability, impact resistance and moldability can be manufactured by using the catalysts for ethylene polymerization according to the invention.

Example 3-1

(1) Preparation of Chromium Catalyst Precursor

A support (silica gel) was prepared in conformity with U.S. Pat. No. 5,232,883. This support had a specific surface area of 800 m$^2$/g, a pore volume of 2.0 cm$^3$/g, and an average particle size of 100 μm.

Further, in conformity with the method of "EXAMPLES I. Catalyst Preparation Procedure" in U.S. Pat. No. 4,119,773, a dichloromethane solution containing chromium(III) acetate and aluminum sec-alkoxide was reacted with the above silica gel so that the contents of Cr and Al became 1% by weight and 2% by weight, respectively, to thereby obtain greenish white chromium catalyst precursor particles having good flowability.

(2) Calcining for Activation of Chromium Catalyst

Activation was performed in a cylindrical activation oven having an inside diameter of 75 cm and a height of 8 m with 180 kg of the chromium catalyst precursor particles obtained in the above (1). The method of activation is shown in Table 6 below. Also, the objective contact temperature and the concentration of introduced oxygen are shown in FIG. 2 in time sequence.

The catalyst was fluidized by dry nitrogen at a linear velocity of 6 cm/s in the oven to which the chromium catalyst precursor particles were put, and the temperature was raised to 150° C. at a temperature rising rate of 60° C./h. Fluidization was continued for 3 hours by dry nitrogen while maintaining the contact temperature at 150° C. The temperature was again raised to 300° C. at a temperature rising rate of 60° C./h, and retained for 1 hour. While retaining the temperature at 300° C., dry nitrogen containing 1% of oxygen was initiated to be introduced at a linear velocity of 6 cm/s, and after retaining for 30 minutes, dry nitrogen containing 2% of oxygen was introduced for 30 minutes. Hereafter, dry nitrogen in which the oxygen concentration was stepwise increased such as 3%→4%→5% was introduced respectively for 2 hours, and then switched to dry air. At the same time, temperature increase was initiated at a temperature rising rate of 60° C./h. After that, calcining was continued for 12 hours while retaining the contact temperature at 400° C. After termination of calcining, the contact temperature was lowered and returned to dry nitrogen not containing oxygen at all. When the contact temperature was lowered to room temperature, the chromium catalyst was extracted in dry nitrogen. On measuring the content of hexavalent chromium, the content was 80%.

(3) Bench Scale Polymerization

Into a sufficiently nitrogen-substituted 2.0 L autoclave were put 100 mg of the chromium catalyst obtained in the above (2) and 0.8 L of isobutane, and the inner temperature was raised to 98° C. 1-Hexene (7.0 g) was pressure introduced by ethylene, and polymerization was performed so that the catalyst productivity became 3,000 g-polymer/g-catalyst with maintaining the ethylene partial pressure at 1.4 MPa. Subsequently, the content gas was discharged out of the system to thereby terminate the polymerization. The result of polymerization and the results of measurement of physical properties (HLMFR, density) are shown in Table 4 below.

Example 3-2

(1) Calcining for Activation of Chromium Catalyst

Activation was performed in a cylindrical activation oven having an inside diameter of 75 cm and a height of 8 m with 180 kg of the chromium catalyst precursor particles obtained in Example 3-1 (1). The method of activation is shown in Table 7 below.

The catalyst was fluidized by dry nitrogen at a linear velocity of 6 cm/s in the oven to which the chromium catalyst precursor particles were put, and the temperature was raised to 150° C. at a temperature rising rate of 60° C./h. Fluidization was continued for 3 hours by dry nitrogen while maintaining the contact temperature at 150° C. The temperature was again raised to 300° C. at a temperature rising rate of 60° C./h, and retained for 1 hour. While retaining the contact temperature at 300° C., dry nitrogen in which oxygen concentration was continuously changed from 0% to 10% at a concentration rising rate of 1%/h was introduced. After that, calcining was continued for 12 hours while retaining the contact temperature at 400° C. After termination of calcining, the contact temperature was lowered and returned to dry nitrogen not containing oxygen at all. When the contact temperature was lowered to room temperature, the chromium catalyst was extracted in dry nitrogen. On measuring the content of hexavalent chromium, the content was 85%.

(2) Bench Scale Polymerization

An ethylene-based polymer was obtained by performing polymerization operation in the same manner as in Example 3-1 (3) by using the chromium catalyst obtained in the above (1). The result of polymerization and the results of measurement of physical properties (HLMFR, density) are shown in Table 4 below.

Example 3-3

(1) Calcining for Activation of Chromium Catalyst

Activation was performed in a cylindrical activation oven having an inside diameter of 75 cm and a height of 8 m with 180 kg of the chromium catalyst precursor particles obtained in the above (1). The method of activation is shown in Table 8 below.

The catalyst was fluidized by dry nitrogen at a linear velocity of 6 cm/s in the oven to which the chromium catalyst precursor particles were put, and the temperature was raised to 150° C. at a temperature rising rate of 60° C./h. Fluidization was continued for 3 hours by dry nitrogen while maintaining the contact temperature at 150° C. The temperature was again raised to 300° C. at a temperature rising rate of 60° C./h, and retained for 1 hour. While retaining the temperature at 300° C., mixture of oxygen and nitrogen in which oxygen concentration was continuously changed from 0% to 5% at a concentration rising rate of 2%/h was introduced. While retaining the oxygen concentration of the introduced mixture at 5%, the temperature was raised to 350° C. at a temperature rising rate of 60° C./h. While retaining the contact temperature at 350° C., dry nitrogen in which oxygen concentration was continuously changed from 5% to 21% at a concentration rising rate of 2%/h was introduced. After that, the temperature was raised to 400° C. at a temperature rising rate of 60° C./h, and calcining was continued for 12 hours while retaining the contact temperature at 400° C. After termination of calcining, the contact temperature was lowered and returned to dry nitrogen not containing oxygen at all. When the contact temperature was lowered to room temperature, the chromium catalyst was extracted in dry nitrogen. On measuring the content of hexavalent chromium, the content was 85%.

(2) Bench Scale Polymerization

An ethylene-based polymer was obtained by performing polymerization operation in the same manner as in Example 3-1 (3) by using the chromium catalyst obtained in the above (1). The result of polymerization and the results of measurement of physical properties (HLMFR, density) are shown in Table 4 below.

Example 3-4

(Plant Scale Polymerization)

To a pipe loop type reactor having a capacity of 200 L, isobutane and the chromium catalyst obtained in Example 3-1 (2) were continuously supplied at a rate of 120 L/h and 5 g/h, respectively. While discharging the content of the reactor at a required velocity, ethylene and 1-hexene were supplied so as to maintain the mass ratio of 1-hexene concentration to ethylene concentration in the liquid phase at 0.10 at 100.5° C., and polymerization was performed continuously on the conditions of total pressure of 4.0 MPa and average residence time of 1.5 hours in the state of being impregnated with the liquid. The productivity of the catalyst was 3,000 g-polymer/g-catalyst, and the average polymerization activity was 2,000 g-polymer/g-catalyst/h. The results of measurement of physical properties (HLMFR, density, MT) are shown in Table 5 below.

Comparative Example 3-1

(1) Calcining for Activation of Chromium Catalyst

Activation was performed in a cylindrical activation oven having an inside diameter of 75 cm and a height of 8 m with 180 kg of the chromium catalyst precursor particles obtained in Example 3-1 (1). The method of activation is shown in Table 9 below.

The catalyst was fluidized by dry nitrogen at a linear velocity of 6 cm/s in the oven to which the chromium catalyst precursor particles were put, and the temperature was raised to 150° C. at a temperature rising rate of 60° C./h. Fluidization was continued for 3 hours by dry nitrogen while maintaining the contact temperature at 150° C. After that, introduced gas was switched from dry nitrogen to dry air, and the temperature was raised to 400° C. at a temperature rising temperature of 60° C./h. However, when introduction of dry air was initiated, the catalyst was combusted by oxygen, and the contact temperature temporarily rose to 530° C. When the contact temperature reached 400° C., the temperature was retained and calcining was continued for 12 hours. After termination of calcining, the contact temperature was lowered and returned to dry nitrogen not containing oxygen at all. When the contact temperature was lowered to room temperature, the chromium catalyst was extracted in dry nitrogen. On measuring the content of hexavalent chromium, the content was 55%.

(2) Bench Scale Polymerization

An ethylene-based polymer was obtained by performing polymerization operation in the same manner as in Example 3-1 (3) by using the chromium catalyst obtained in the above (1). The result of polymerization and the results of measurement of physical properties (HLMFR, density) are shown in Table 4 below.

Comparative Example 3-2

(1) Calcining for Activation of Chromium Catalyst

Activation was performed in a cylindrical activation oven having an inside diameter of 75 cm and a height of 8 m with 180 kg of the chromium catalyst precursor particles obtained in Example 3-1 (1). The method of activation is shown in Table 10 below.

The catalyst was fluidized by dry nitrogen at a linear velocity of 6 cm/s in the oven to which the chromium catalyst precursor particles were put, and the temperature was raised to 150° C. at a temperature rising rate of 60° C./h. Fluidization was continued for 3 hours by dry air while maintaining the contact temperature at 150° C. After that, the temperature was raised to 200° C. at a temperature rising rate of 60° C./h, and fluidization was continued for further 3 hours by dry air. Temperature rising was initiated at a rate of 60° C./h, and at the same time introduction of dry air was initiated at a linear velocity of 6 cm/s. When the contact temperature reached 340° C., the catalyst was combusted by oxygen, and the contact temperature steeply rose and the contact temperature temporarily increased to 520° C. When the contact temperature reached 400° C., the temperature was retained and calcining was continued for 12 hours. After termination of calcining, the contact temperature was lowered and returned to dry nitrogen not containing oxygen at all. When the contact temperature was lowered to room temperature, the chromium catalyst was extracted in dry nitrogen. On measuring the content of hexavalent chromium, the content was 60%.

(2) Bench Scale Polymerization

An ethylene-based polymer was obtained by performing polymerization operation in the same manner as in Example 3-1 (3) by using the chromium catalyst obtained in the above (1). The result of polymerization and the results of measurement of physical properties (HLMFR, density) are shown in Table 4 below.

Comparative Example 3-3

(1) Calcining for Activation of Chromium Catalyst

Activation was performed in a cylindrical activation oven having an inside diameter of 75 cm and a height of 8 m with 180 kg of the chromium catalyst precursor obtained in Example 3-1 (1). The method of activation is shown in Table 11 below.

The catalyst was fluidized by dry nitrogen at a linear velocity of 6 cm/s in the oven to which the chromium catalyst precursor particles were put, and the temperature was raised to 150° C. at a temperature rising rate of 60° C./h. Fluidization was continued for 3 hours by dry nitrogen while maintaining the contact temperature at 150° C. The temperature was again raised to 400° C. at a temperature rising rate of 60° C./h, and retained for 1 hour. Dry nitrogen containing 1% of oxygen was initiated to be introduced at a linear velocity of 6 cm/s, and after retaining for 30 minutes, dry nitrogen containing 2% of oxygen was introduced for 30 minutes. Hereafter, dry nitrogen in which the oxygen concentration was stepwise increased such as 3%→4%→5% was introduced respectively for 2 hours. Further, dry nitrogen in which oxygen concentration was continuously changed from 5% to 21% at a concentration rising rate of 2%/h was introduced. The catalyst was combusted by oxygen, and the contact temperature rose to the highest and the contact temperature temporarily increased to 550° C., but after that, calcining was continued for 12 hours while maintaining the contact temperature at 400° C. After termination of calcining, the contact temperature was lowered and returned to dry nitrogen not containing oxygen at all. When the contact temperature was lowered to room temperature, the chromium catalyst was extracted in dry nitrogen. On measuring the content of hexavalent chromium, the content was 60%.

(2) Bench Scale Polymerization

An ethylene-based polymer was obtained by performing polymerization operation in the same manner as in Example 3-1 (3) by using the chromium catalyst obtained in the above (1). The result of polymerization and the results of measurement of physical properties (HLMFR, density) are shown in Table 4 below.

Comparative Example 3-4

(Plant Scale Polymerization)

To a pipe loop type reactor having a same capacity (200 L) as in Example 3-4, isobutane and the chromium catalyst obtained in Comparative Example 3-2 (1) were continuously supplied at a rate of 120 L/h and 5 g/h, respectively. While discharging the content of the reactor at a required velocity, ethylene and 1-hexene were supplied so as to maintain the mass ratio of 1-hexene concentration to ethylene concentration in the liquid phase at 0.10 at 102.5° C., and polymerization was performed continuously on the conditions of total pressure of 4.0 MPa and average residence time of 1.5 hours in the state of being impregnated with the liquid. The productivity of the catalyst was 2,900 g-polymer/g-catalyst, and the average polymerization activity was 1,900 g-polymer/g-catalyst/h. The results of measurement of physical properties (HLMFR, density, MT) are shown in Table 5 below.

As can be understood from the above results, when bench scale polymerization was performed on the same condition (Example 3-1 and Comparative Example 3-1), an ethylene-based polymer having high flowability (HLMFR) was obtained with the polymer obtained in Example 3-1. Further, when polymerization was performed on a plant scale, to obtain ethylene polymers having the same HLMFR, it was necessary to heighten the polymerization temperature by 2° C. in Comparative Example 3-4 as compared with Example 3-4. Further, the melt tension of the ethylene-based polymer obtained in Example 3-4 was higher than that of the ethylene-based polymer obtained in Comparative Example 3-4.

TABLE 4

|  | Example 3-1 | Example 3-2 | Example 3-3 | Comparative Example 3-1 | Comparative Example 3-2 | Comparative Example 3-3 |
|---|---|---|---|---|---|---|
| Proportion of Cr (VI) in total Cr (%) | 80 | 85 | 85 | 55 | 60 | 60 |
| Polymerization scale | Bench | Bench | Bench | Bench | Bench | Bench |
| Polymerization temperature (° C.) | 98 | 98 | 98 | 98 | 98 | 98 |
| Ethylene (MPa) | 1.4 | 1.4 | 1.4 | 1.4 | 1.4 | 1.4 |
| 1-Hexene (g) | 7 | 7 | 7 | 7 | 7 | 7 |
| Activity (g/g/h) | 2,000 | 2,100 | 2,000 | 2,000 | 1,900 | 1,900 |
| HLMFR (g/10 min) | 4.9 | 5.0 | 5.2 | 3.9 | 4.1 | 4.0 |
| Density | 0.9487 | 0.9488 | 0.9490 | 0.9476 | 0.9478 | 0.9481 |

TABLE 5

|  | Example 3-4 | Comparative Example 3-4 |
|---|---|---|
| Polymerization scale | Plant | Plant |
| Polymerization temperature (° C.) | 100.5 | 102.5 |
| Ethylene (wt %) | 6.5 | 6.5 |
| 1-Hexene/ethylene (wt/wt) | 0.08 | 0.08 |
| HLMFR (g/10 min) | 4.5 | 4.6 |
| Density | 0.9491 | 0.9479 |
| MT (mN) | 24 | 21 |

TABLE 6

| Step | Objective Contact Temperature | Objective Temperature Rising Rate | Required Time in Step | Total Time | Introduced Mixed Gas | Concentration of Introduced Oxygen | Linear Velocity of Introduced Mixed Gas | Real Contact Temperature | Step |
|---|---|---|---|---|---|---|---|---|---|
| 1 | Temp. rising from 20° C. to 150° C. | 60° C./h | 2.16 h | 2.16 h | $N_2$ | 0 | 6 cm/s | Temperature was raised with retaining objective contact temperature. | |
| 2 | 150° C. | — | 3 h | 5.16 h | $N_2$ | 0 | 6 cm/s | Objective contact temperature of 150° C. was retained. | $1^{st}$ Step |
| 3 | Temp. rising from 150° C. to 300° C. | 60° C./h | 2.5 h | 7.66 h | $N_2$ | 0 | 6 cm/s | Temperature was raised with retaining objective contact temperature. | |
| 4 | 300° C. | — | 1 h | 8.66 h | $N_2$ | 0 | 6 cm/s | Objective contact temperature of 300° C. was retained. | |
| 5 | 300° C. | — | 0.5 h | 9.16 h | $O_2 + N_2$ | 1% | 6 cm/s | Constant temperature of 310° C. was retained. | $2^{nd}$ Step |
| 6 | 300° C. | — | 0.5 h | 9.66 h | $O_2 + N_2$ | 2% | 6 cm/s | Constant temperature of 315° C. was retained. | $2^{nd}$ Step |
| 7 | 300° C. | — | 2 h | 11.66 h | $O_2 + N_2$ | 3% | 6 cm/s | Constant temperature of 320° C. was retained. | $2^{nd}$ Step |
| 8 | 300° C. | — | 2 h | 13.66 h | $O_2 + N_2$ | 4% | 6 cm/s | Constant temperature of 320° C. was retained. | $2^{nd}$ Step |
| 9 | 300° C. | — | 2 h | 15.66 h | $O_2 + N_2$ | 5% | 6 cm/s | Constant temperature of 320° C. was retained. | $2^{nd}$ Step |
| 10 | Temp. rising from 300° C. to 400° C. | 60° C./h | 1.66 h | 17.32 h | Air ($O_2 + N_2$) | 21% | 6 cm/s | Just after starting the step, temperature rose to 400° C. due to combustion, and on and after 30 minutes from the step, objective contact temperature was retained. | |

TABLE 6-continued

| Step | Objective Contact Temperature | Objective Temperature Rising Rate | Required Time in Step | Total Time | Introduced Mixed Gas | Concentration of Introduced Oxygen | Linear Velocity of Introduced Mixed Gas | Real Contact Temperature | Step |
|---|---|---|---|---|---|---|---|---|---|
| 11 | 400° C. | — | 12 h | 29.32 h | Air ($O_2 + N_2$) | 21% | 6 cm/s | Constant temperature of 400° C. was retained. | 3$^{rd}$ Step |
| 12 | Temp. lowering from 400° C. to 300° C. | 85° C./h | 1.18 h | 30.5 h | Air ($O_2 + N_2$) | 21% | 6 cm/s | Temperature was lowered with retaining objective contact temperature. | |
| 13 | Temp. lowering from 300° C. to 20° C. | 85° C./h | 3.29 h | 33.78 h | $N_2$ | 0 | 6 cm/s | Temperature was lowered with retaining objective contact temperature. | |

TABLE 7

| Step | Objective Contact Temperature | Objective Temperature Rising Rate | Required Time in Step | Total Time | Introduced Mixed Gas | Concentration of Introduced Oxygen | Linear Velocity of Introduced Mixed Gas | Real Contact Temperature | Step |
|---|---|---|---|---|---|---|---|---|---|
| 1 | Temp. rising from 20° C. to 150° C. | 60° C./h | 2.16 h | 2.16 h | $N_2$ | 0 | 6 cm/s | Temperature was raised with retaining objective contact temperature. | |
| 2 | 150° C. | — | 3 h | 5.16 h | $N_2$ | 0 | 6 cm/s | Objective contact temperature of 150° C. was retained. | 1$^{st}$ Step |
| 3 | Temp. rising from 150° C. to 300° C. | 60° C./h | 2.5 h | 7.66 h | $N_2$ | 0 | 6 cm/s | Temperature was raised with retaining objective contact temperature. | |
| 4 | 300° C. | — | 1 h | 8.66 h | $N_2$ | 0 | 6 cm/s | Objective contact temperature of 300° C. was retained. | |
| 5 | 300° C. | — | 10 h | 18.66 h | $N_2 \rightarrow O_2 + N_2$ | 0 → 10% (introduced oxygen concentration was continuously increased at a rate of 1%/h) | 6 cm/s | After initiating the step, the temperature rose to the maximum of 380° C. | 2$^{nd}$ Step |
| 6 | Temp. rising from 300° C. to 400° C. | 60° C./h | 1.66 h | 20.32 h | Air ($O_2 + N_2)_2$ | 21% | 6 cm/s | Just after starting the step, temperature rose to 350° C. due to combustion, and on and after 15 minutes from the step, objective contact temperature was retained. | 2$^{nd}$ Step |
| 7 | 400° C. | — | 12 h | 32.32 h | Air ($O_2 + N_2$) | 21% | 6 cm/s | Objective contact temperature of 400° C. was retained. | 3$^{rd}$ Step |
| 8 | Temp. lowering from 400° C. to 300° C. | 85° C./h | 1.18 h | 33.5 h | Air ($O_2 + N_2$) | 21% | 6 cm/s | Temperature was lowered with retaining objective contact temperature. | |
| 9 | Temp. lowering from 300° C. to 20° C. | 85° C./h | 3.29 h | 36.79 h | $N_2$ | 0 | 6 cm/s | Temperature was lowered with retaining objective contact temperature. | |

TABLE 8

| Step | Objective Contact Temperature | Objective Temperature Rising Rate | Required Time in Step | Total Time | Introduced Mixed Gas |
|---|---|---|---|---|---|
| 1 | Temp. rising from 20° C. to 150° C. | 60° C./h | 2.16 h | 2.16 h | $N_2$ |
| 2 | 150° C. | — | 3 h | 5.16 h | $N_2$ |
| 3 | Temp. rising from 150° C. to 300° C. | 60° C./h | 2.5 h | 7.66 h | $N_2$ |
| 4 | 300° C. | — | 1 h | 8.66 h | $N_2$ |
| 5 | 300° C. | — | 2.5 h | 11.16 h | $N_2 \rightarrow O_2 + N_2$ |
| 6 | Temp. rising from 300° C. to 350° C. | 60° C./h | 0.83 h | 11.99 h | $O_2 + N_2$ |
| 7 | 350° C. | — | 8 h | 19.99 h | $O_2 + N_2$ |
| 8 | Temp. rising from 350° C. to 400° C. | 60° C./h | 0.83 h | 20.82 h | Air ($O_2 + N_2$) |
| 9 | 400° C. | — | 12 h | 32.82 h | Air ($O_2 + N_2$) |

TABLE 8-continued

| 10 | Temp. lowering from 400° C. to 300° C. | 85° C./h | 1.18 h | 34 h Air (O$_2$ + N$_2$) |
| 11 | Temp. lowering from 300° C. to 20° C. | 85° C./h | 3.29 h | 37.29 h N$_2$ |

| Step | Concentration of Introduced Oxygen | Linear Velocity of Introduced Mixed Gas | Real Contact Temperature | Step |
|---|---|---|---|---|
| 1 | 0 | 6 cm/s | Temperature was raised with retaining objective contact temperature. | |
| 2 | 0 | 6 cm/s | Objective contact temperature of 150° C. was retained. | 1$^{st}$ Step |
| 3 | 0 | 6 cm/s | Temperature was raised with retaining objective contact temperature. | |
| 4 | 0 | 6 cm/s | Objective contact temperature of 300° C. was retained. | |
| 5 | 0 → 5% (introduced oxygen concentration was continuously increased at a rate of 2%/h) | 6 cm/s | After starting the step, temp. rose to 350° C., and retained this temperature until termination of the step. | 2$^{nd}$ Step |
| 6 | 5% | 6 cm/s | After starting the step, temp. rose to the maximum of 370° C. | 2$^{nd}$ Step |
| 7 | 5 → 21% (introduced oxygen concentration was continuously increased at a rate of 2%/h) | 6 cm/s | Just after starting the step, temp. rose to the maximum of 380° C. due to combustion, and lowered to 350° C. at termination of the step. | 2$^{nd}$ Step |
| 8 | 21% | 6 cm/s | Temperature was raised with retaining objective contact temperature. | 2$^{nd}$ Step |
| 9 | 21% | 6 cm/s | Objective contact temperature of 400° C. was retained. | 3$^{rd}$ Step |
| 10 | 21% | 6 cm/s | Temperature was lowered with retaining objective contact temperature. | |
| 11 | 0 | 6 cm/s | Temperature was lowered with retaining objective contact temperature. | |

TABLE 9

| Step | Objective Contact Temperature | Objective Temperature Rising Rate | Required Time in Step | Total Time | Introduced Mixed Gas | Concentration of Introduced Oxygen | Linear Velocity of Introduced Mixed Gas | Real Contact Temperature |
|---|---|---|---|---|---|---|---|---|
| 1 | Temp. rising from 20° C. to 150° C. | 60° C./h | 2.16 h | 2.16 h | N$_2$ | 0 | 6 cm/s | Temperature was raised with retaining objective contact temperature. |
| 2 | 150° C. | — | 3 h | 5.16 h | N$_2$ | 0 | 6 cm/s | Objective contact temperature of 150° C. was retained. |
| 3 | Temp. rising from 150° C. to 400° C. | 60° C./h | 4.17 h | 9.33 h | Air (O$_2$ + N$_2$) | 21% | 6 cm/s | Just after starting the step, the temperature rose to the maximum of 530° C., and on and after 2 hours from the step, objective contact temperature was retained. |
| 4 | 400° C. | — | 12 h | 21.33 h | Air (O$_2$ + N$_2$) | 21% | 6 cm/s | Objective contact temperature of 400° C. was retained. |
| 5 | Temp. lowering from 400° C. to 300° C. | 85° C./h | 1.18 h | 22.51 h | Air (O$_2$ + N$_2$) | 21% | 6 cm/s | Temperature was lowered with retaining objective contact temperature. |
| 6 | Temp. lowering from 300° C. to 20° C. | 85° C./h | 3.29 h | 25.8 h | N$_2$ | 0 | 6 cm/s | Temperature was lowered with retaining objective contact temperature. |

TABLE 10

| Step | Objective Contact Temperature | Objective Temperature Rising Rate | Required Time in Step | Total Time | Introduced Mixed Gas | Concentration of Introduced Oxygen | Linear Velocity of Introduced Mixed Gas | Real Contact Temperature |
|---|---|---|---|---|---|---|---|---|
| 1 | Temp. rising from 20° C. to 150° C. | 60° C./h | 2.16 h | 2.16 h | Air (O$_2$ + N$_2$) | 21% | 6 cm/s | Temperature was raised with retaining objective contact temperature. |
| 2 | 150° C. | — | 3 h | 5.16 h | Air (O$_2$ + N$_2$) | 21% | 6 cm/s | Objective contact temperature of 150° C. was retained. |

TABLE 10-continued

| Step | Objective Contact Temperature | Objective Temperature Rising Rate | Required Time in Step | Total Time | Introduced Mixed Gas | Concentration of Introduced Oxygen | Linear Velocity of Introduced Mixed Gas | Real Contact Temperature |
|---|---|---|---|---|---|---|---|---|
| 3 | Temp. rising from 150° C. to 200° C. | 60° C./h | 0.83 h | 5.99 h | Air ($O_2 + N_2$) | 21% | 6 cm/s | Temperature was raised with retaining objective contact temperature. |
| 4 | 200° C. | — | 3 h | 8.99 h | Air ($O_2 + N_2$) | 21% | 6 cm/s | Objective contact temperature of 200° C. was retained. |
| 5 | Temp. rising from 200° C. to 400° C. | — | 3.33 h | 12.32 h | Air ($O_2 + N_2$) | 21% | 6 cm/s | Object contact temperature was retained until 340° C., and after arriving 340° C., the contact temperature temporarily rose to the maximum of 520° C., and lowered to the objective contact temperature at the time of termination of the step. |
| 6 | 400° C. | — | 12 h | 24.32 h | Air ($O_2 + N_2$) | 21% | 6 cm/s | Objective contact temperature of 400° C. was retained. |
| 7 | Temp. lowering from 400° C. to 300° C. | 85° C./h | 1.18 h | 25.5 h | Air ($O_2 + N_2$) | 21% | 6 cm/s | Temperature was lowered with retaining objective contact temperature. |
| 8 | Temp. lowering from 300° C. to 20° C. | 85° C./h | 3.29 h | 28.79 h | $N_2$ | 0 | 6 cm/s | Temperature was lowered with retaining objective contact temperature. |

TABLE 11

| Step | Objective Contact Temperature | Objective Temperature Rising Rate | Required Time in Step | Total Time | Introduced Mixed Gas | Concentration of Introduced Oxygen | Linear Velocity of Introduced Mixed Gas | Real Contact Temperature |
|---|---|---|---|---|---|---|---|---|
| 1 | Temp. rising from 20° C. to 150° C. | 60° C./h | 2.16 h | 2.16 h | $N_2$ | 0 | 6 cm/s | Temperature was raised with retaining objective contact temperature. |
| 2 | 150° C. | — | 3 h | 5.16 h | $N_2$ | 0 | 6 cm/s | Objective contact temperature of 150° C. was retained. |
| 3 | Temp. rising from 150° C. to 400° C. | 60° C./h | 4.17 h | 9.33 h | $N_2$ | 0 | 6 cm/s | Temperature was raised with retaining objective contact temperature. |
| 4 | 400° C. | — | 1 h | 10.33 h | $N_2$ | 0 | 6 cm/s | Objective contact temperature of 400° C. was retained. |
| 5 | 400° C. | — | 0.5 h | 10.83 h | $O_2 + N_2$ | 1% | 6 cm/s | Constant temperature of 415° C. was retained. |
| 6 | 400° C. | — | 0.5 h | 11.33 h | $O_2 + N_2$ | 2% | 6 cm/s | Constant temperature of 420° C. was retained. |
| 7 | 400° C. | — | 2 h | 13.33 h | $O_2 + N_2$ | 3% | 6 cm/s | Constant temperature of 425° C. was retained. |
| 8 | 400° C. | — | 2 h | 15.33 h | $O_2 + N_2$ | 4% | 6 cm/s | Constant temperature of 425° C. was retained. |
| 9 | 400° C. | — | 2 h | 17.33 h | $O_2 + N_2$ | 5% | 6 cm/s | Constant temperature of 430° C. was retained. |
| 10 | 400° C. | — | 8 h | 25.33 h | $O_2 + N_2$ | 5 → 21% (introduced oxygen concentration was continuously increased at a rate of 2%/h) | 6 cm/s | Just after starting the step, the temperature rose to the maximum of 550° C. and on and after 2 hours from the step, objective contact temperature was retained. |
| 11 | 400° C. | — | 12 h | 37.33 h | Air ($O_2 + N_2$) | 21% | 6 cm/s | Constant temperature of 400° C. was retained. |
| 12 | Temp. lowering from 400° C. to 300° C. | 85° C./h | 1.18 h | 38.51 h | Air ($O_2 + N_2$) | 21% | 6 cm/s | Temperature was lowered with retaining objective contact temperature. |
| 13 | Temp. lowering from 300° C. to 20° C. | 85° C./h | 3.29 h | 41.8 h | $N_2$ | 0 | 6 cm/s | Temperature was lowered with retaining objective contact temperature. |

While the invention has been described in detail with reference to specific embodiments thereof, it will be apparent to one skilled in the art that various changes and modifications can be made therein without departing from the spirit and scope thereof. The present application is related to Japanese patent application filed on Mar. 30, 2011 (Japanese Patent Application No. 2011-074900), and the disclosure of which is incorporated herein by reference.

INDUSTRIAL APPLICABILITY

The method for manufacturing an ethylene-based polymer of the invention can manufacture an ethylene-based polymer by high polymerization activity, and the ethylene-based polymer manufactured by the method of the invention is excellent in moldability, durability, a barrier property and, in addition, excellent in the balance of impact resistance and stiffness. A molded product of hollow plastic using the ethylene-based polymer of the invention is especially suitable for a fuel tank, particularly the fuel tank of an automobile, and the industrial significance is high.

The invention claimed is:

1. A method for manufacturing an ethylene-based polymer, comprising homopolymerizing ethylene or copolymerizing ethylene and α-olefin in the presence of a catalyst obtained by activating a catalyst precursor (d) at 250° C. to 550° C. in a non-reducing atmosphere, the catalyst precursor (d) consisting essentially of:
an inorganic oxide support (a) having 0.5 to 5.0% by weight of aluminum and having a specific surface area of 625 to 1,000 $m^2/g$ and a pore volume of 1.0 to 5.0 $cm^3/g$; and
a chromium compound (b) supported on the support (a), wherein the catalyst does not have an organic aluminum compound supported thereon after said activating.

2. The method for manufacturing an ethylene-based polymer as claimed in claim 1, wherein the activation temperature is 300 to 500° C.

3. The method for manufacturing an ethylene-based polymer as claimed in claim 1, wherein said catalyst is obtained by activating catalyst precursor (d) at 300° C. to 425° C. in a non-reducing atmosphere.

4. The method for manufacturing an ethylene-based polymer as claimed in claim 1, wherein inorganic oxide support (a) has a specific surface area of 650 to 950 $m^2/g$ and a pore volume of 1.0 to 3.0 $cm^3/g$.

5. The method for manufacturing an ethylene-based polymer as claimed in claim 1, wherein inorganic oxide support (a) has a specific surface area of 700 to 900 $m^2/g$ and a pore volume of 1.2 to 2.5 $cm^3/g$.

6. The method for manufacturing an ethylene-based polymer as claimed in claim 3, wherein inorganic oxide support (a) has a specific surface area of 700 to 900 $m^2/g$ and a pore volume of 1.2 to 2.5 $cm^3/g$.

7. The method for manufacturing an ethylene-based polymer as claimed in claim 1, wherein said inorganic oxide support consists of silica and 0.5 to 5.0% by weight of aluminum.

8. The method for manufacturing an ethylene-based polymer as claimed in claim 1, comprising homopolymerizing ethylene.

9. The method for manufacturing an ethylene-based polymer as claimed in claim 1, comprising copolymerizing ethylene and α-olefin, and wherein the α-olefin has 3 to 8 carbon atoms.

10. The method for manufacturing an ethylene-based polymer as claimed in claim 1, comprising copolymerizing ethylene and α-olefin.

11. The method for manufacturing an ethylene-based polymer as claimed in claim 10, wherein the α-olefin is one or more of propylene, 1-butene, 1-hexene, 4-methyl-1-pentene, and 1-octene.

12. The method for manufacturing an ethylene-based polymer as claimed in claim 10, wherein the α-olefin is 1-butene.

13. The method for manufacturing an ethylene-based polymer as claimed in claim 10, wherein the α-olefin is 1-hexene.

14. The method for manufacturing an ethylene-based polymer as claimed in claim 10, wherein the content of α-olefin in the ethylene-based polymer is 15 mol % or less.

15. The method for manufacturing an ethylene-based polymer as claimed in claim 10, wherein the content of α-olefin in the ethylene-based polymer is 10 mol % or less.

16. The method for manufacturing an ethylene-based polymer as claimed in claim 11, wherein the content of α-olefin in the ethylene-based polymer is 15 mol % or less.

17. The method for manufacturing an ethylene-based polymer as claimed in claim 12, wherein the content of α-olefin in the ethylene-based polymer is 15 mol % or less.

18. The method for manufacturing an ethylene-based polymer as claimed in claim 13, wherein the content of α-olefin in the ethylene-based polymer is 15 mol % or less.

19. The method for manufacturing an ethylene-based polymer as claimed in claim 1, wherein the ethylene-based polymer produced by said method has the following characteristics (1) to (8):
(1) the high load melt flow rate (HLMFR) is 1 to 10 g/10 min,
(2) the density is 0.940 to 0.960 $g/cm^3$,
(3) the molecular weight distribution (Mw/Mn) is 25 or more,
(4) the strain hardening parameter of elongation viscosity (λmax) is 1.05 to 1.50,
(5) the Charpy impact strength is 7 $kJ/m^2$ or more,
(6) the tensile impact strength is 130 $kJ/m^2$ or more,
(7) the swell ratio (SR) is 50 to 65%, and
(8) the rupture time in the full notch creep test is 40 hours or more.

* * * * *